United States Patent
Ludwig et al.

(10) Patent No.: US 11,636,238 B2
(45) Date of Patent: Apr. 25, 2023

(54) ESTIMATING NOISE CHARACTERISTICS IN PHYSICAL SYSTEM SIMULATIONS

(71) Applicant: The MathWorks, Inc., Natick, MA (US)

(72) Inventors: Alon Ludwig, Needham, MA (US); Ebrahim Mestchian, Newton, MA (US); Pieter Mosterman, Waltham, MA (US); Mark Reichelt, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 1087 days.

(21) Appl. No.: 16/253,728

(22) Filed: Jan. 22, 2019

(65) Prior Publication Data

US 2020/0134110 A1 Apr. 30, 2020

Related U.S. Application Data

(60) Provisional application No. 62/753,238, filed on Oct. 31, 2018.

(51) Int. Cl.
*G06F 30/20* (2020.01)
*G06F 17/16* (2006.01)
(Continued)

(52) U.S. Cl.
CPC .............. *G06F 30/20* (2020.01); *G06F 17/16* (2013.01); *G09B 23/10* (2013.01); *G09B 23/12* (2013.01); *G09B 23/18* (2013.01)

(58) Field of Classification Search
CPC ..... G06F 17/16; G06F 2119/10; G09B 23/10; G09B 23/12; G09B 23/18
See application file for complete search history.

(56) References Cited

U.S. PATENT DOCUMENTS 6,212,490 B1 4/2001 Li et al.
6,778,025 B1 8/2004 Leuthold
(Continued)

OTHER PUBLICATIONS

Cooman et al. Distortion Contribution Analysis by Combining the Best Linear Approximation and Noise Analysis, IEEE 2014 (Year: 2014).*

(Continued)

*Primary Examiner* — Rehana Perveen
*Assistant Examiner* — Cuong V Luu
(74) *Attorney, Agent, or Firm* — Young Basile Hanlon & MacFarlane, P.C.

(57) ABSTRACT

Model elements of an executable model, representing a physical system, are partitioned into one or more linear portions and one or more nonlinear portions. Simulating behavior of the physical system, by executing the model, includes, for each of multiple simulation time intervals, for a first nonlinear portion, computing a correlation matrix characterizing noise associated with one or more ports of the model. A scattering matrix corresponds to a portion of the physical system represented by the first nonlinear portion without accounting for any noise within the portion of the physical system. The correlation matrix is derived from the scattering matrix based on noise within the portion of the physical system. Noise sources representing noise within the portion of the physical system are identified based on the correlation matrix. At least one characteristic of noise associated with each noise source is computed, and noise characteristics are output at selected ports.

36 Claims, 9 Drawing Sheets

(51) Int. Cl.
*G09B 23/18* (2006.01)
*G09B 23/12* (2006.01)
*G09B 23/10* (2006.01)

(56) References Cited

U.S. PATENT DOCUMENTS 8,200,470 B2 * 6/2012 Stanley ................ G06F 30/367
716/110
8,326,591 B1 12/2012 Cai et al.
8,332,200 B2 12/2012 Troedsson
8,595,669 B1 11/2013 Keller et al.

OTHER PUBLICATIONS

Bhattacharya et al. Convergence Issues in Resoant Tunneling Diode Circuit Simulation IEEE 2018 (Year: 2018).*
Han et al. An Efficient Graph Sparsification Approach to Scalable Harmonic Balance (HB) Analysis of Strongly Nonlinear RF Circuits IEEE 2013 (Year: 2013).*
Demir et al. Modeling and Simulation of Noise in Analog/Mixed-Signal Communication Systems IEEE 1999 (Year: 1999).*
Linear Functions (Year: 2014).*
Rothe, H., Dahlke, W., Theory of Noisy Fourpoles, Proceedings of the IRE, Jun. 1956, pp. 811-818.
Hillbrand, Herbert, Russer, Peter H., An Efficient Method for Computer Aided Noise Analysis of Linear Amplifier Networks, IEEE Transactions on Circuits and Systems, Apr. 1976, pp. 235-238, vol. CAS-23, No. 4.
Wedge, Scott W., Rutledge, David B., Noise Waves and Passive Linear Multiports, IEEE Microwave and Guided Wave Letters, May 1991, pp. 117-119, vol. 1, No. 5.
Wedge, Scott W., Rutledge, David B., Wave Techniques for Noise Modeling and Measurement, IEEE Transactions on Microwave Theory and Techniques. Nov. 1992, pp. 2004-2012, vol. 40, No. 11.
Telichevesky, Richardo, Kundert, Ken, White, Jacob, Receiver Characterization using Periodic Small-Signal Analysis, IEEE 1996 Custom Integrated Circuits Conference, pp. 449-452.
Cadence Design Systems, Inc , Virtuoso Spectre Circuit Simulator RF Analysis User Guide, Product Version 3.2, Jun. 2007.
Gustavsen, Bjorn, Semlyen, Adam, Enforcing Passivity for Admittance Matrices Approximated by Rational Functions, IEEE Transactions on Power Systems, Feb. 2001, pp. 97-104, vol. 16, No. 1.
Gustavsen, Bjorn, Semlyen, Adam, Rational Approximation of Frequency Domain Responses by Vector Fitting, IEEE Transactions on Power Delivery, Jul. 1999, pp. 1052-1061, vol. 14, No. 3.

* cited by examiner

ESTIMATING NOISE CHARACTERISTICS IN PHYSICAL SYSTEM SIMULATIONS

CROSS-REFERENCE TO RELATED APPLICATION(S)

This application claims priority to and the benefit of U.S. Provisional Application Ser. No. 62/753,238, filed Oct. 31, 2018, the entire disclosure of which is hereby incorporated by reference.

SUMMARY

In one aspect, in general, a method includes: analyzing, by one or more processors, model elements of an executable model to partition the model elements into one or more linear portions of the executable model and one or more nonlinear portions of the executable model, the executable model representing a physical system comprising a hydraulic system, an electrical system, a mechanical system, or a pneumatic system; and executing the executable model to simulate behavior of the physical system. The simulating including, for each of multiple time intervals of the simulation: for a first nonlinear portion, computing a correlation matrix characterizing noise associated with one or more ports of the executable model, the computing comprising (1) determining a scattering matrix that corresponds to a portion of the physical system represented by the first nonlinear portion without accounting for any noise within the portion of the physical system, and (2) based on noise within the portion of the physical system, deriving the correlation matrix from the scattering matrix, identifying noise sources representing noise within the portion of the physical system based on the correlation matrix, computing at least one characteristic of noise associated with each noise source, and outputting noise characteristics at selected ports of the executable model.

In another aspect, in general, a computing system includes one or more processors configured to: analyze model elements of an executable model to partition the model elements into one or more linear portions of the executable model and one or more nonlinear portions of the executable model, the executable model representing a physical system comprising a hydraulic system, an electrical system, a mechanical system, or a pneumatic system; and execute the executable model to simulate behavior of the physical system. The simulating includes, for each of multiple time intervals of the simulation: for a first nonlinear portion, computing a correlation matrix characterizing noise associated with one or more ports of the executable model, the computing comprising (1) determining a scattering matrix that corresponds to a portion of the physical system represented by the first nonlinear portion without accounting for any noise within the portion of the physical system, and (2) based on noise within the portion of the physical system, deriving the correlation matrix from the scattering matrix, identifying noise sources representing noise within the portion of the physical system based on the correlation matrix, computing at least one characteristic of noise associated with each noise source, and outputting noise characteristics at selected ports of the executable model.

In another aspect, in general, one or more non-transitory computer-readable media, have stored thereon instructions that, when executed by a computing system, cause the computing system to perform operations comprising: analyzing model elements of an executable model to partition the model elements into one or more linear portions of the executable model and one or more nonlinear portions of the executable model, the executable model representing a physical system comprising a hydraulic system, an electrical system, a mechanical system, or a pneumatic system; and executing the executable model to simulate behavior of the physical system. The simulating includes, for each of multiple time intervals of the simulation: for a first nonlinear portion, computing a correlation matrix characterizing noise associated with one or more ports of the executable model, the computing comprising (1) determining a scattering matrix that corresponds to a portion of the physical system represented by the first nonlinear portion without accounting for any noise within the portion of the physical system, and (2) based on noise within the portion of the physical system, deriving the correlation matrix from the scattering matrix, identifying noise sources representing noise within the portion of the physical system based on the correlation matrix, computing at least one characteristic of noise associated with each noise source, and outputting noise characteristics at selected ports of the executable model.

Aspects can include one or more of the following features.

Outputting noise characteristics at selected ports of the executable model includes computing at least one noise characteristic for each of the selected ports of the executable model based at least in part on a representation of the physical system that includes representations of the linear portions of the executable model and linearized representations of the nonlinear portions of the executable model.

Outputting noise characteristics at selected ports of the executable model includes simulating at least one signal that has values computed based at least in part on the noise characteristics.

Operations of the model elements are performed on signals without noise and on signals with noise separately, before simulating the signal.

The simulating further includes linearizing the first nonlinear portion at a first operating point during a first of the time intervals of the simulation, and computing the correlation matrix based on a linear representation of the first nonlinear portion.

The simulating further includes repeating the linearizing of the first nonlinear portion after a second operating point during a second of the time intervals of the simulation exceeds a tolerance from the first operating point.

During the linearizing of the first nonlinear portion, if a number of iterations to reach the linear representation of the first nonlinear portion exceeds a threshold for converging, changing a length of the first time interval.

Outputting the noise characteristics at selected ports of the executable model includes rendering a plot that includes a characterization of the noise associated with at least one noise source.

The method further includes, before executing the executable model, for one or more of the linear portions of the executable model, pre-computing at least one noise representation associated with a portion of the physical system represented by the one or more of the linear portions, where the pre-computed noise representation is used, during execution of the executable model, for determining noise characteristics associated with the one or more of the linear portions.

The simulating further includes using the outputted noise characteristics to modify the executable model to reduce noise when simulating the behavior of the physical system.

The partitioning includes sorting representations of equations corresponding to the model elements, where the sorting is based at least in part on one or more of: a presence of nonlinearity, a presence of memory effects, or a magnitude of a time derivative of a variable in the equations.

The sorting is based at least in part on a comparison between: (1) a magnitude of a time derivative of a variable in a first equation corresponding to a first model element, and (2) a magnitude of a nonlinear effect due to a presence of nonlinearity in the first equation.

The portion of the physical system represented by the first nonlinear portion stores energy.

Computing the scattering matrix includes: computing time varying noise parameters over multiple time instances during a first time interval of the multiple time intervals, based on an autocorrelation characterizing a memory effect of the energy storage of the portion of the physical system represented by the first nonlinear portion.

Computed noise characteristics associated with at least one of the noise sources include noise values representing a time evolution of noise based on at least one statistical moment of second or higher order associated with signal values representing a statistical mean. For example, each of the noise values may be smaller than each of the signal values, where the noise values are "small signal" values and the signal values are "large signal" values, as described in more detail below.

The portion of the physical system represented by the first nonlinear portion stores energy, and computed noise characteristics associated with at least one of the noise sources include small signal noise values representing a time evolution of noise based on at least one statistical moment associated with large signal values representing a statistical mean.

DETAILED DESCRIPTION

1 Overview

Figure 1:
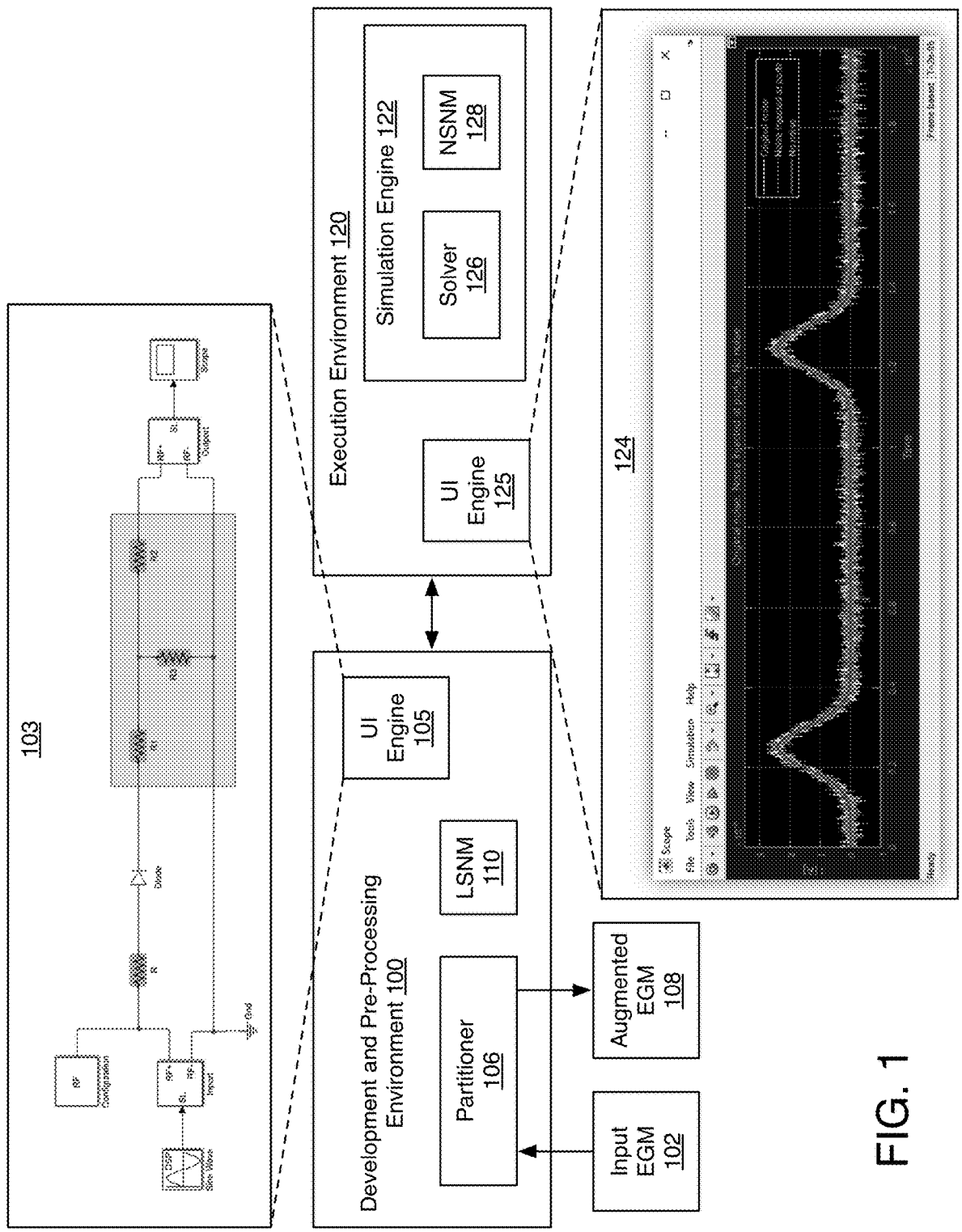
FIG. 1 is a block diagram of an example modeling environment.

A development environment is provided for developing an executable graphical model (EGM) that can be executed within a computational modeling system (CMS). For example, the CMS can enable various forms of modeling such as simulating a physical system represented by the EGM, enabling certain characteristics of that physical system to be analyzed including noise characteristics. For example, noise characteristics may include time evolution of noise existing in different signals within a model system that simulates a physical system (e.g., at different ports within the model system). Automatic characterization of noise (e.g., thermal noise) in simulations of physical systems may be useful for solving problems in various technical fields such as control theory, signal processing, and communication systems. For example, solving non-ideal problems more accurately can assist with determining potential effects that noise impairments may have on the operation of physical systems in such technical fields. The simulation results can be used for design and construction of physical systems, including design of hardware modules of physical systems, and testing and/or generation of code of embedded software modules of physical systems, for example. Different kinds of physical systems, in different "physics domains" can be simulated including, for example: electrical systems, mechanical systems, hydraulic systems, pneumatic systems, thermal systems, or chemical systems. Examples of different signals that are represented in the different physics domains for simulating different physical systems are described below in section 3.

An EGM may be graphically represented in any of a variety of graphical forms, depending on the type of modeling being performed. For example, an EGM can be represented as a block diagram, where blocks of the block diagram can represent portions of a physical system such as individual components (e.g., circuit elements where the block diagram represents a circuit diagram) interconnected by links representing component connectivities or information transfer (e.g., wires carrying physical signals represented by variables, such as current, voltage, etc. in a circuit diagram, or, more generally, any quantity that has a representation in time, where in some models there may be signals that at some time intervals are disabled, so they would not have a representation for certain time intervals at which a model part is disabled (or not active)). In some embodiments, elements of an EGM (called "model elements"), are executable components that receive an input such as values of an internal variable or values of an external signal, and behave according to a defined system functionality (e.g., according to a mathematical function and/or an algorithm or other computation) based on that input to provide an output. Values of the input and output over time can be represented as input signals and output signals, respectively, as described below. An EGM may be composed of interconnections of many different types of model elements with different system functionality, with any number of input signals and/or output signals. The variable that represents a signal is typically is time dependent, such that the value of the signal is defined for each of a series of values of time. The time between successive signal values may correspond to time steps that represent sampling an underlying continuous-time signal, which may vary as a sampling rate varies. Other representations of signals are also possible. In some implementations, the signals are expressed in the frequency-domain, in addition to, or instead of, time-domain representations.

The behavior of a model element may have certain properties, such as linearity, time-invariance, and passivity. Without intending to be bound by theory, for illustrative purposes, an example set of definitions of these properties are as follows. A linear system may be one in which an input signal that is a weighted sum of individual input signals yields as a system response an output signal that is the same weighted sum (i.e., using the same scale factors) of the system responses to the individual input signals. A "nonlinear" model element can thus be referred to as a model element whose system function does not satisfy this linearity property, and a nonlinear portion of an EGM may be referred to as one that includes at least one nonlinear model element. A time-invariant system may be one in which an input signal that is shifted in time by a particular time delay yields as a system response an output signal that shifted in time by the same particular time delay. A passive system generally refers to a system that does not provide an output signal that has more power than the input signal over a sustained amount of time, though power may be temporarily stored in the system and released over time. If power is lost through dissipation in the passive system, then the average power of the output signal will be lower than the average power of the input signal. If the passive system is lossless, then the power of the output signal will be the same as the power of the input signal. By contrast, an active system may provide power to an output signal, for example, from a power source. Under one definition, a passive system is one for which, under all possible conditions of excitation the energy absorbed by the system over the entire past is positive. A passive linear and time-invariant (LTI) system also has the property of being stable.

Noise in a physical system (e.g., an electrical, mechanical, hydraulic, or chemical system) simulated by a EGM can originate from thermal dissipation. Thermal dissipation in such physical systems can be represented in the corresponding model represented by the EGM, and used to compute the resulting noise characteristics of simulated signals of the model due to that thermal dissipation. In the case of an electrical system model, this thermal noise can be caused by thermal dissipation in resistive elements of the system (i.e., because of thermal agitation, or random motion, of charges in the resistive elements). This temperature-dependent thermal noise can be estimated using Bosma's theorem (explained in more detail below), under the assumptions that the system is a passive LTI system, and is in thermal equilibrium. For the purpose of description, the temperature-dependent thermal noise, and other noise that can be automatically determined using the techniques described herein is called "internal noise." But, there may be noise from different sources. This internal noise can also, optionally, be combined with any "external noise" that may be present in the modeled physical system because of other noise sources, which may not be able to be automatically determined.

For example, some external noise sources may be specified by a user, since a particular noise source may be associated with the input from another system, which may not be simulated. Other external noise sources may not be representable using models of thermal noise sources. One common example in electronic devices is "pink noise" which may have a nonuniform spectrum (as opposed to thermal noise which may have a "white noise" spectrum). Examples of pink noise, for example, may include "1/f noise" and "flicker noise."

Such external noise can be specified by a user, for example, using a noise input for one or more model elements. The internal noise computations can be described in terms of variables for electrical systems (e.g., current and voltage), but there are analogous variables that can be used when modeling other types of physical systems and their internal noise based on analogous thermal dissipation in those systems (e.g., heat loss due to friction in a mechanical system), as described in more detail below.

It would be useful to estimate the internal noise as properties of a small signal (e.g., stochastic variance and higher order moments) around a large signal (e.g., stochastic mean) of a simulated output, which may be computed using analytical computation techniques based on analytic formulae, numerical estimation techniques, or a combination of both, for example. But, there may be potential challenges to estimating internal noise. For example, some systems include aspects having nonlinear behavior, which are modeled by nonlinear portions of the model, as described above. If these nonlinear portions are still passive and time-invariant, Bosma's theorem can still be used to estimate the internal noise over a small time step over which its behavior can be approximated as linear. But, computing a linear approximation for the entire model every time step may be computationally costly and/or prohibitive in some cases (though in some cases it may be a viable approach).

To mitigate this potential challenge, before the simulation is executing, the system is partitioned into one or more linear portions and one or more nonlinear portions (which may also be called "subsystems"). Before the simulation is executing, an s-parameter representation (SPR) can be computed for each model portion that is passive and LTI. Bosma's theorem can then be used to compute a representation of the internal noise at a given port of the passive LTI model portion (e.g., a noise voltage source) based on the SPR computed before simulation execution begins. During execution of the simulation, at each time step, an SPR and internal noise can also be computed for each passive nonlinear model portion by linearizing that model portion to provide an equivalent passive LTI subsystem for that time step. Any model portions or subsystems that are not passive or not time-invariant can be simulated separately and assumed to be noiseless, or with noise introduced explicitly as external noise inputs to the ports of the system or subsystem. Optionally, techniques can be used to combine the internal noise with external noise at each time step, for example by introducing the internal noise as signals and adding them at the relevant circuit ports. Mathematically, the resulting approximation may be more accurate if the external sources are independent of the internal sources and both are considered small signal.

To appropriately handle potential memory effects of linear elements that store energy (e.g., elements with capacitance or inductance), the procedure to divide the system into model portions or subsystems can be configured to lump together linear elements into linear model portions or subsystems. This includes, in some cases, keeping linear energy storing elements (e.g., networks of capacitors and inductors) within the linear model portions or subsystems and not in the nonlinear model portions or subsystems, even if it means breaking a single nonlinear model portion, system, or subsystem up into multiple nonlinear subsystems to exclude linear energy storing elements. In some implementations, these model portions or subsystems may only be created in temporary storage and may be invisible to the user in a user interface view of the system (and, for example, shown when the user requests viewing of the model portions or subsystems). For example, some or all of this processing could be performed on an intermediate representation that is stored in temporary storage (e.g., in computer memory). This lumping of linear storage elements may avoid potential linear memory effects that would be created by the energy storing elements if they were included in the nonlinear subsystems. Since memory effects in a passive nonlinear model portion or subsystem can break the time-invariance assumption, this enables the passive nonlinear model portion or subsystems to be estimated as an equivalent passive LTI subsystem for the purpose of using Bosma's theorem.

FIG. 1 shows an example of a modeling environment that includes a development and pre-processing environment 100 in which an EGM can be analyzed and augmented for simulating noise characteristics of a physical system, and an execution environment 120 in which an augmented EGM can be executed to simulate the physical system. In some embodiments, the development and pre-processing environment 100 and the execution environment 120 can be integrated into the same environment, and in alternative embodiments, certain tasks that are described in the context of one environment may be part of the other environment. The development and pre-processing environment 100 allows a user to select an input EGM 102 (or develop a new EGM or modify an existing EGM), and optionally any information for configuring the input EGM 102, such as external noise characteristics at one or more ports of model elements of the input EGM 102 on a screen display 103 supported by a user interface (UI) engine 105. A partitioner 106 executing in the development and pre-processing environment 100 analyzes the model elements of the input EGM 102 to partition the model elements into one or more linear portions of the input EGM 102 and one or more nonlinear portions of the input EGM 102. Results of the partitioning are included in an augmented EGM 108, which associates information about the results of the partitioning with the input EGM 102 (e.g., as part of compiling an EGM into an intermediate representation, or at any point during or after development of an EGM). For example, the augmented EGM 108 can include metadata that records information about different model elements as a member of a particular partition. A linear subsystem noise module (LSNM) 110 executes in the development and pre-processing environment 100 and generates an SPR for linear subsystems corresponding to the linear partitions. The LSNM 110 also performs other noise modeling computations and updates the augmented EGM 108 (or simulation information associated with the augmented EGM 108) accordingly, as described in more detail below. The model portions on which the LSNM 110 operates do not have to correspond to a subsystem blocks in the EGM 108. In alternative examples, any of the linear (or nonlinear) subsystems described herein may also be represented by a model portion without necessarily creating a subsystem hierarchical layer.

A simulation engine 122 executes the augmented EGM 108 within the execution environment 120 to simulate the behavior of the physical system. That behavior includes signals at different ports, for example, in the time and/or frequency domain, and a characterization of noise characteristics of the physical system at those ports. For example, the simulation can output noise characteristics associated with a particular signal at a particular port on a screen 124 of a UI engine 125. The simulation engine 122 includes a solver module 126 that performs various computations used to provide the signal values at each time step, and a nonlinear subsystem noise module (NSNM) 128. For example, the solver module 126 solves the equations/constraints that are represented by an EGM. The NSNM 128 generates an SPR for nonlinear subsystems corresponding to the nonlinear partitions, and performs other noise modeling computations and updates the augmented EGM 108 (or simulation information associated with the augmented EGM 108) accordingly, as described in more detail below. As the EGM is updated during execution of the simulation, there is an instantaneous representation of that EGM that may optionally be provided at any point in the simulation to a user. In some embodiments, the LSNM 110 and NSNM 128 may be part different modes of the same computational module that performs linear or nonlinear processing, as appropriate, based on a parameter.

In some embodiments, the noise characteristics are represented as a series of "small signal" noise values associated with a series of noiseless "large signal" values. For example, the small signal noise can be represented as statistical variance, whose value provides an envelope (e.g., see FIG. 4) around the large signal. In the case of thermal noise, for example, the statistical mean (i.e., first moment) is zero and therefore the noise can be largely characterized by its variance (i.e., second moment) around the ideal noiseless signal as the large signal. However, other types of noise may have different moments, including a first moment, which contribute to the overall signal. In some embodiments, by providing this small signal noise as a separate signal, using the techniques described herein for handling any nonlinearities, the simulation executed in the execution environment 120 is able to efficiently and automatically estimate the time-evolution of the noise (e.g., represented as a time-dependent variance) at the ports of the physical system. In some embodiments, the small signal noise can be added to the large signal, providing a signal that is simulated with noise. For example, the visual representation of a simulated signal rendered on the screen 124 in the example of FIG. 1 shows an ideal signal without noise as a baseline signal, with a noise signal superimposed on the baseline signal. The visual representation can be generated using any of a variety of techniques, which includes simulating the noise signal based on determined noise characteristics such as noise variance, as described in more detail below.

Advantages of these techniques for automatically determining noise characteristics include avoiding the need for a user to reconfigure their model so they can determine where to add sources that represent thermal noise, for example. Additionally, the user does not need to have any knowledge of modeling noise sources, which is knowledge that a user who models physical systems at a lumped parameter level does not necessarily have. Automatic determination of noise also enables more realistic simulation of real world systems, which typically contain noise. Noise may also be an aspect of controlling physical elements or parts of a system. For example, with automatic determination of noise, the simulation can model correction mechanisms (e.g., feedback mechanisms) that keep the noise bounded to maintain a specified accuracy. This can be accomplished, for example, by control of temperature (e.g., cooling) within specific subsystems. Minimal correction for such noise bounding may be achieved using optimization techniques.

Both the development and pre-processing environment 100 and the execution environment 120 can be hosted on a computing systems, including one or more general-purpose computers configured to provide the CMS, as described in more detail below in section 5. In some embodiments, the development and pre-processing environment 100 and the execution environment 120 are hosted on the same computing system, and any of the modules executing within the environments can be part of the same computer program. Different embodiments can combine functionality as modules within the same computer program. For example, in some embodiments, the partitioner 106 and LSNM 110 are part of the simulation engine 122 along with the solver module 126 and NSNM 128, implemented as software modules within the same computer program. In some embodiments, the development and pre-processing environment 100 and the execution environment 120 are identical, as in the modeling environment of the example of section 5.

2 Exemplary EGM Preparation and Execution

Figure 2:
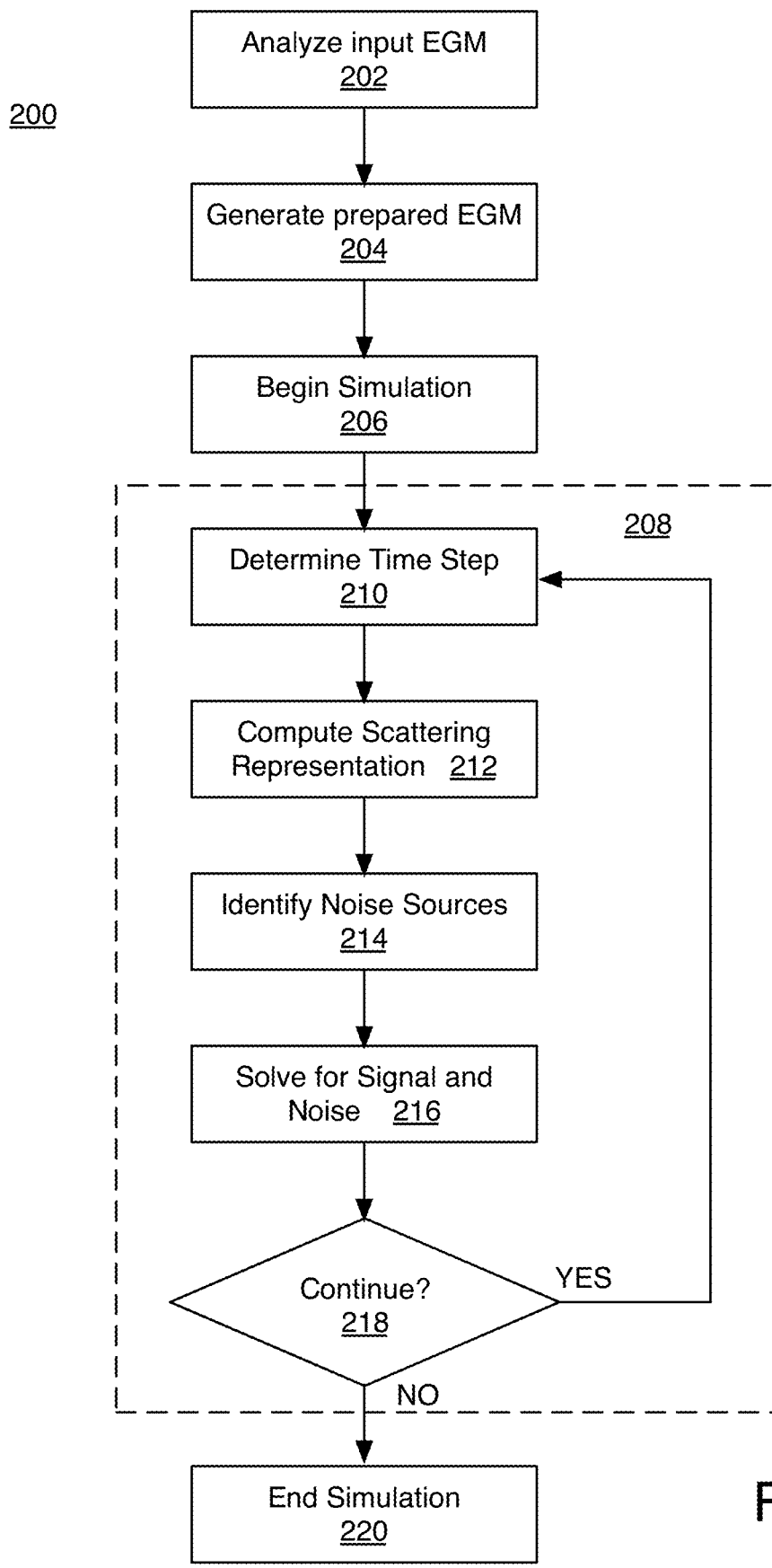
FIG. 2 is a flowchart of an example procedure for preparing and executing an EGM.

In FIG. 2, an exemplary procedure 200 for preparing and executing the EGM 108 is shown. The procedure 200 includes analyzing 202 the input EGM 102 to partition the model elements into one or more linear portions and one or more nonlinear portions. The procedure 200 includes generating 204 the augmented EGM 108 that has been partitioned and that includes information resulting from the computations performed by the LSNM 110 for the linear portions, as described in more detail below. The generating 204 of the augmented EGM 108 can be performed at any time before the simulation begins 206, including just before the simulation begins. There may be initial setup computations that are associated with beginning the simulation. During operation, the simulation repeats a loop 208 in which iterations of various computations associated with the nonlinear portions are performed for a particular time interval. In this example, the computations performed for each iteration may include one or more of the following steps (some of which may be optional for any given loop iteration): determining 210 how large the time step will be, computing 212 a scattering representation (e.g., a scattering correlation matrix) for each nonlinear portion (by the NSNM 128), identifying 214 noise sources for the ports of each nonlinear portion (by the NSNM 128), and solving 216 for signal values and associated noise characteristics for each noise source in each nonlinear portion, such as an estimated statistical variance corresponding to mean value (by the solver module 126). For implementations in which only the small signal noise characteristics are computed (analytically) for each port, instead of being simulated as a small signal superimposed on a large signal, the solving step 216 may involve computing small signal noise characteristics but not large signal values. The solving step 216 may itself involve multiple iterations, which may end, for example, after equation solutions have converged. If convergence is not reached within a reasonable time limit then, the loop 208 may need to be repeated using a different (e.g., shorter) time step. Alternatively, an upper bound on the iterations can be set and any approximation that results from this limit may be accepted. If the simulation is to continue 218 (e.g., based on a predetermined simulation duration, or based on dynamic user input), the loop repeats so that the computations are performed for the next time interval. Otherwise, the simulation ends 220. The noise characteristics can be presented to a user during the simulation, and/or after the simulation ends. For example, if a simulation trace is presented with an instance of noise superimposed on the trace, then the superimposed noise, characterized by the noise characteristics, may be presented to the user during simulation. At any time during or after the simulation, the user may also request information about the noise including the noise characteristics and/or the partitioned model with the noise sources shown. One of the steps that is optional is step 210, since for some iterations a previously determined time step may be used. The steps performed during the loop 208 may also include any number of additional steps that are not necessarily associated with handling noise.

As the loop is executing, the simulation evolves over successive time intervals. During each "actual time interval" the modules of the simulation engine 122, including the solver module 126 and the NSSM 128, perform their respective computations. Those computations performed in a given actual time interval produce results that are associated with a corresponding "simulated time interval" representing time in a simulated reality. The length of time between successive simulated time intervals (e.g., the length of time between two points in time that have a solution computed in simulation) is the "time step" of the simulation, which in some cases varies as the simulation evolves. Successive time intervals may be abutting. There is not necessarily any direct relationship between the length of any particular actual time interval and the corresponding simulated time interval, since it depends on the amount of time necessary to perform the computations for a particular time step. In some cases, it may take more actual time a physical sense (i.e., a longer actual time interval) to perform computations needed to model behavior for a small time step (i.e., a shorter simulated time interval) used to simulate a rapidly varying signal, than the actual time it takes to perform computations necessary to model behavior for a large time step used to simulate a slowly varying signal.

The analyzing 202 can be performed by the partitioner 106 that partitions the overall system represented by the interconnection of model elements within the input EGM 102 into linear portions that represent linear subsystems, and nonlinear portions that represent nonlinear subsystems. In one example of a partitioning algorithm used by the partitioner 106, an initial step involves analyzing a system of equations that is generated by determining element equations for model elements, and structural equations that are based on connectivity of those model elements. For example, connectivity can be determined by parsing a topological representation of the interconnected model elements of the input EGM 102. The parsing can include a graph traversal algorithm, or a topological sorting algorithm, for example. Linear equations can be identified by iterating through a list of equations and determining whether an output is a linear function of an input, or whether there are nonlinear relationships (e.g., because of exponential, logarithmic relationships). The storing 204 can include storing metadata in the augmented EGM 108 to indicate which non-overlapping sets of model elements correspond to a linear partition (containing no nonlinear model elements), or a nonlinear partition (containing at least one nonlinear model element). A model element may be associated with a set of equations that represent the behavior of the model element and some of these equations may be partitioned into a linear subsystem while others may be partitioned into a nonlinear subsystem. As such, the model elements may be partitioned at a lower granularity based on their underlying equations or algorithms. Moreover, an equation as entered by a user may be processed into a set of equations (e.g., by introducing intermediate variables) so that the linear and nonlinear parts within an equation may be separated out. Example techniques for solving such equations are described below (e.g., in the Exemplary solution techniques section).

In some embodiments, the partitioning algorithm performs merging to optimize partitions. For example, the partitioner 106 may group a maximum number of linear model elements together into a single linear partition, while keeping, to the extent possible, only nonlinear model elements in each nonlinear partition. One reason to exclude a particular linear model element from a nonlinear partition, for example, is to exclude linear memory effects created by networks of capacitors and inductors from being included in the nonlinear partition, as described in more detail below. There may be more than one possible resulting partitioning of any particular input EGM 102 represented by the augmented EGM 108, depending on different trade-offs that were made when merging partitions.

In some cases, the input EGM 102 includes only passive and time-invariant model elements. In those cases, the techniques described herein may be applied to all of the model elements, since the assumptions about passivity and time-invariance, as described in more detail below, may be applied to all of the model elements. In other cases, the EGM 102 may include model elements that are not passive and/or are not time-invariant. In those cases, any model elements in the input EGM 102 that are not passive or are not time-invariant, or are neither passive nor time-invariant, may be simulated in a subsystem that is separate from the subsystems represented by the partitioned sets of model elements. The subsystem that is simulated separately may be noiseless, or may be simulated with noise being explicitly provided as inputs to the ports of that subsystem.

The LSNM 110 generates a frequency dependent SPR for each linear subsystem. For example, without intending to be bound by theory, Bosma's theorem can be used to compute a scattering correlation matrix $C_s$, of the subsystem:

$$C_s = kT(1-SS^\dagger)$$

where S is the multiport scattering matrix corresponding to the subsystem, k is Botzmann's constant, and T is temperature. The scattering matrix S can be multiplied by a vector of the input signals at the input ports to provide a vector of the output signals at the output ports based on those input signals, without the effects of internal noise. Cholesky factorization of the scattering correlation matrix can be used (e.g., for a Hermitian symmetric $C_s$, which is true when the linear subsystem is passive) to obtain a vector of correlated noise wave sources at each port of the subsystem. These wave sources represent internal noise, and can be used along with any externally provided noise to model noise characteristics of the subsystem. The LSNM 110 can be configured to replace each noisy passive LTI subsystem with an equivalent noiseless passive LTI (NPL) subsystem plus the computed correlated noise wave sources at the input and output ports of the NPL subsystem, as illustrated in the example below. These frequency dependent noise sources can be represented in the frequency domain, or can be represented in the time domain via an inverse Fourier Transform to give noise sources represented by a temporal autocorrelation function. Additional details of the computations can be found, for example, in Wedge et al., "Noise Waves and Passive Linear Multiports," IEEE Microwave and Guided Wave Letters, Vol. 1, No. 5, May 1991, and in Wedge et al., "Wave Techniques for Noise Modeling and Measurement," IEEE Transactions on Microwave Theory and Techniques, Vol. 40, No. 11, November 1992, each of which is incorporated herein by reference. The LSNM 110 can also be configured to gather any additional information associated with the ports of each subsystem, including at which ports noise estimation is enabled and any externally provided input noise data.

With the linear subsystems having been processed for determining noise characteristics before simulation begins, the simulation engine 122 only needs to determine noise characteristics during simulation (i.e., over the multiple time steps of the simulation) for the nonlinear subsystems. The simulation engine 122 may also perform steps to combine results for the different linear and nonlinear subsystems to determine the characteristics of signals at the ports, including noise characteristics, for the overall combined system that is being modeled and simulated. The following example steps that are performed by the solver module 126 and the NSNM 128 for determining noise characteristics of the nonlinear subsystems are described in terms of variables associated with modeling an electrical system (i.e., currents and voltages), but any appropriate variables can be used in these steps, depending on the physics domain being modeled, as described in section 3.

Various assumptions can be used for some implementations of the modules and/or for some EGMs. In some implementations, the assumptions (or assumed operational characteristics) are explicitly checked, and in some implementations, the assumptions are not necessarily checked, but may be left for a user to validate. If the assumptions do not hold, then the techniques may still be used, but may provide results that may be modified and/or qualified depending on the extent to which an assumption is violated. As mentioned above, one assumption is that the nonlinear subsystems include only passive and time-invariant model elements. Another assumption is that each time step that is used is small enough for the solver module 126 to converge on a solution for output signal values based on the results in the previous time step. In some implementations, the solver module 126 can be configured to vary the size of each time step, if necessary, to reach convergence. Another assumption is that the change in a nonlinear subsystem variable for the current time $\Delta \vec{X}(t_{current})$ is small enough compared to the previously solved change in that variable for the previous time $\Delta \vec{X}(t_{prev})$ such that each of the one or more nonlinear subsystems is locally approximately linear. For example, one feature that can be used to determine whether a nonlinear subsystem is locally approximately linear is that it can be approximated using an impulse response where the duration over which the magnitude of the impulse response is significantly larger than zero does not exceed the time step. This feature of the impulse response also indicates that the nonlinear subsystem is shallow in memory, which is the case when model elements associated with linear memory effects (e.g., inductors and capacitors) are excluded from the nonlinear subsystems in the partitioning process. In the following examples, each nonlinear subsystem is initially approximated as being completely memoryless. Such a zero-order approximation of the nonlinear subsystem temporal behavior corresponds to a representation of the subsystem, for the electrical domain, as a network of resistors.

In a first step performed by the NSNM 128 in a given time step, the currents, $\vec{I}$, and voltages, $\vec{V}$, at the ports of the nonlinear subsystem at the beginning of that time step are analyzed. A first order approximation of the temporal behavior a nonlinear subsystem can be obtained from the currents, $\vec{I}$, and voltages, $\vec{V}$, and their derivatives in time, $d\vec{I}/dt$, and $d\vec{V}/dt$ at the subsystems ports. This data can be used to obtain an RLC network to replace a zero-order resistor network, if the derivatives are not negligible. Otherwise, the NSNM 128 can be configured to synthesize a resistor network that represents the linearized response of the nonlinear subsystem. If the same resistor network is used in multiple time steps, the values of the resistors may vary from one time step to another. In general, higher order time derivatives can be further used to estimate a subsystem with a longer impulse response duration and those can be translated into a partial fraction expression of the following form:

$$Z(s) = \sum_i \frac{r_i}{s - p_i} + D$$

where s is the Laplace complex frequency, and the coefficients $r_i$, $p_i$, and D can be obtained using algorithms such as vector fitting. For example, vector fitting is described in more detail in Gustaysen et al., "Rational approximation of frequency domain responses by vector fitting," IEEE Trans.

Power Del., Vol. 14, No. 3, pp. 1052-1061, July, 1999, incorporated herein by reference. The passivity of the partial fraction expansion can be enforced, and therefore the subsystem can be realized as an RLC circuit using synthesis techniques. An example of such enforcing is described in more detail in Gustavsen et al., "Enforcing passivity for admittance matrices approximated by rational functions," IEEE Trans. Power Systems, Vol 16, pp. 97-104, February 2001, incorporated herein by reference. One example of a synthesis technique is the Foster synthesis method described in Guillemin, "Synthesis of passive networks," $2^{nd}$ edition, John Wiley (1959), incorporated herein by reference.

In a second step performed by the NSNM 128 in a given time step, since the nonlinear subsystem is now estimated by a passive LTI subsystem, the technique used by the LSNM 110 to replace the noisy passive LTI subsystem with an equivalent NPL subsystem plus the computed correlated noise wave sources can be used. In particular, the correlation noise wave sources representing the noise emanating at each time step from the locally linearized nonlinear subsystem are obtained. In the case of a zero-order approximation (resistor network), the noise wave sources will be frequency independent. For higher order approximations, the noise wave sources will be frequency dependent, representing a random variable with a limited but nonzero autocorrelation length (i.e., short memory). The frequency response of the noise wave sources can be represented in the time domain via an inverse Fourier Transform to give noise sources with short, but finite length, autocorrelation functions.

In a third step performed by the NSNM 128 in a given time step, the noise characteristics can be represented by a computed variance. The noise waves emanating from different subsystems are uncorrelated (since they originate from different internal thermal sources). However, the noise waves emanating from different ports of each subsystem may be correlated. This correlation is obtained from the elements of the upper triangular matrix R, being the Cholesky factorized $C_s = R^\dagger R$. Practically, if a subsystem has n input and/or output ports, the NSNM 128 can determine n uncorrelated sources. Each of these sources can be processed individually by replicating it at each port with amplitude of 1V times the row matrix elements of R and solving the linearized circuit to obtain the noise wave amplitude at the desired output port. At the end, the sum of the magnitude squared value of each uncorrelated noise wave represents the variance of the entire noise at the output ports.

When the noise waves have a non-vanishing autocorrelation (coming from memory effects as discussed above), the calculation of the noise variance at the ports can be performed by including the noise amplitude of previous time steps contained in the autocorrelation duration. In particular, if the length over which the autocorrelation has a significant amplitude corresponds to a delay that is smaller than the time step, then the memory effect is considered "shallow" and can be neglected. However, if the memory effect is not shallow, then the simulated time interval can be subdivided into smaller time intervals to compute effects due to the autocorrelation not being essentially an impulse function. With smaller time intervals (i.e., smaller time steps), the noise effect may be simulated in more detail. Alternatively, if the time interval is made larger, the noise effect may become shallow. In some implementations, there may be a trade off between the accuracy of simulating the dynamics vs. the accuracy of the noise simulation. Also, if a larger time step is used, the solver module 126 may switch numerical differential equations solvers to use algorithms more amenable to larger time steps (e.g., because of accuracy or stability characteristics).

Alternatively, the third step performed by the NSNM 128 in a given time step is also able to incorporate external noise sources. For example, a user may be interested in introducing other types of noise sources (i.e., 1/f noise, etc.), and/or may be interested in accounting for the noise as part of the signal affecting the operation point of the nonlinear subsystems. Simply adding up the uncorrelated noise variances at the system ports (ports the user indicated noise is required) may not be sufficient in some cases. Instead, the noise may need to be simulated explicitly using random signals that are added directly to the noiseless signal. In case the noise is very small compared to the signal and it is important to simulate it at high accuracy, the noise signal may be kept as a separate internal signal while keeping trace of the noise signals at all internal nodes of the system (except within the linear subsystems). Noise sources specified by the user can be introduced based on their autocorrelation function (or spectral characteristics). Noise sources calculated by the LSNM 110 or by the NSNM 128 may be represented using white noise sources (in which the random noise signal at each time point is uncorrelated with the previous time point) followed by a transfer function defined by the autocorrelation function corresponding to the frequency dependency of the determined noise source. In case of memoryless systems (e.g., resistive networks), the noise will remain white. Since the noise is no longer specified using its variance, but rather explicitly generated using random signals, the variance at the desired ports can be computed from the output signal via statistical analysis.

A system that contains nonlinear subsystems or time-variant components will produce time varying noise variance at the ports. In such cases, the statistical analysis of the signal can be performed over time, which in turn calls for the added noise to be fast-varying compared to the signal throughout the system. This enables mean-based separation of noise variance from signal mean. The rate at which noise is added throughout the system dictates the simulation time step and should be adjusted based on the convergence of the calculated variance at the ports of interest. This can be done by configuring the solver module 126 to use a requirement for statistical variance convergence along with a requirement for Newton iteration convergence in the determination of the time step within the time-marching scheme used to solve the equations for the system.

Figure 3A:
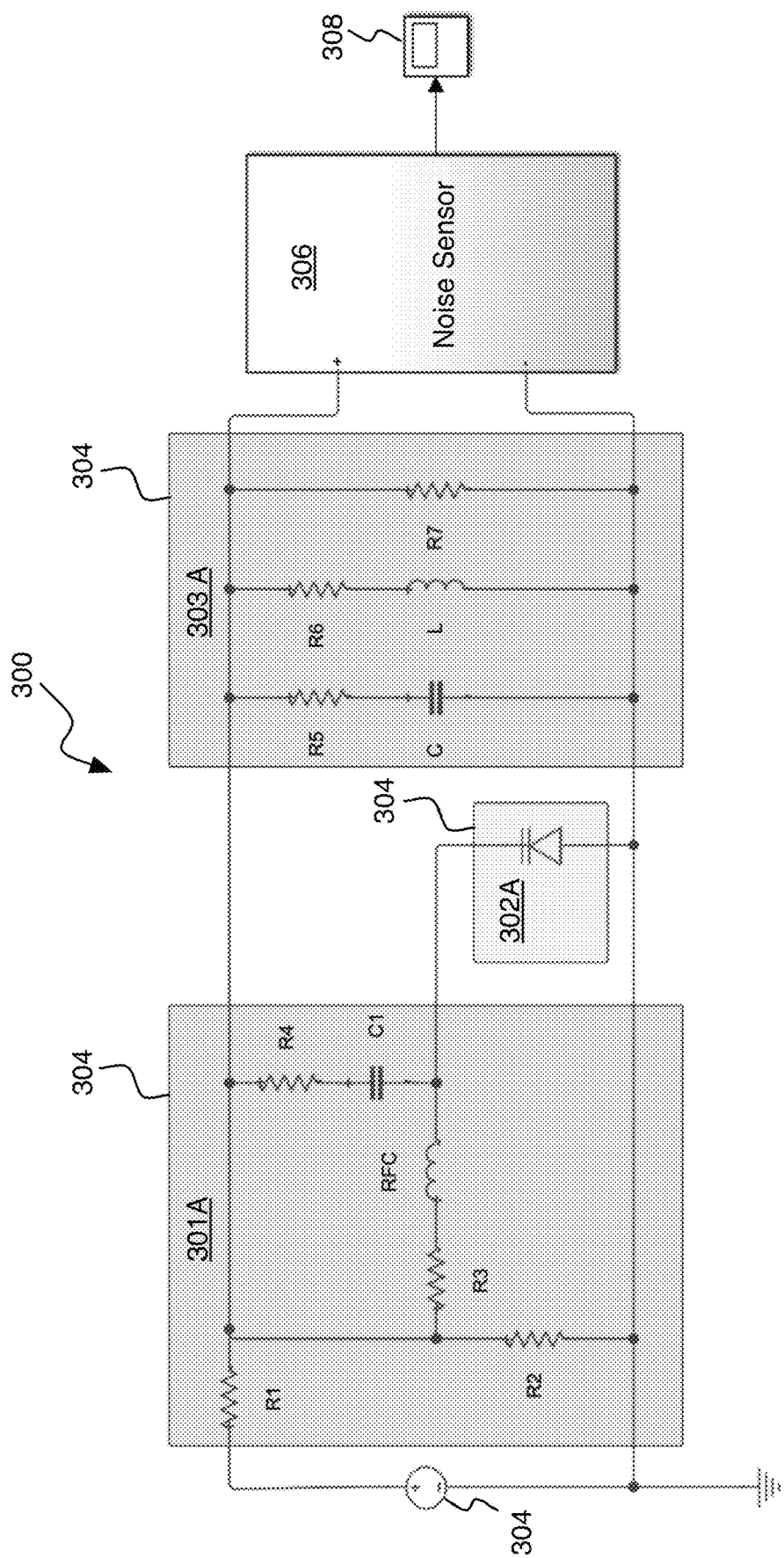
FIG. 3A is a schematic diagram of an electrical circuit system.

FIGS. 3A-3F show various circuit diagrams that illustrate an example of various steps performed when preparing for and executing a simulation within the development and pre-processing environment 100 and the execution environment 120. FIG. 3A shows an example electrical circuit diagram 300 for a case in which the physical system being modeled by an input EGM is an electrical circuit. In this example, the electrical circuit diagram 300 is rendered to visually display the partitions determined by the partitioner 106: a partition 301A that includes a first set of linear circuit elements in one portion of the circuit forming a linear subsystem, a partition 302A that includes a nonlinear circuit element alone in its own nonlinear subsystem, and a partition 303A that includes a second set of linear circuit elements in another portion of the circuit forming a linear subsystem. In this example, the linear circuit elements in the partitions 301A and 303A are resistors, capacitors, and inductors, and the nonlinear circuit element in the partition 302A is a varactor diode. As shown in this example, the rendering of the electrical circuit diagram 300 may include visual indicators, such as the boxes 304 shown in FIG. 3A, or highlighting color of block foreground, highlighting color of block background, highlighting color of block text, shading block outline, block line width changes, etc. that highlight for the user which circuit elements have been grouped within a partition. Alternative cues may affect the blocks that are not part of the partition such as lowlighting the foreground color of those blocks. Optionally, there may be additional visual cues, such as providing different colors or shading to indicate the type of partition (e.g., linear or nonlinear). The illustrated circuit topology corresponds to a voltage controlled resonant circuit (for example, commonly used in radio frequency (RF) applications), which uses the varactor diode to change the total capacitance of the resonant circuit, and therefore its corresponding resonance frequency.

Some model elements, such as model elements at an input or output of an EGM are not necessarily included in the partitions discovered by the partitioner 106. In this example, there is a voltage source 304 at an input port of the linear subsystem of partition 301A, and a noise sensor model element 306 at an output port of the linear subsystem of partition 303A. The voltage source 304 is a model element that can be configured by a user to simulate a desired voltage signal, such as a DC or low frequency control voltage pattern in the case of the voltage controlled resonant circuit of this example. The noise sensor model element 306 is configured to process the voltage signal at the output of the voltage controlled resonant circuit (which in this example is the voltage across a resistor in partition 303A) and provide a representation of the signal along with information about its noise characteristics (e.g., the noise variance). The representation provided by the sensor model element 306 may be a series of values that can be rendered to provide a visual representation of a simulated signal with noise, or may indicate noise characteristics in some other form such as a magnitude of a noise variance. The representation is rendered visually on a user interface screen, as indicated within the diagram 300 by a scope element 308 that is not part of the system being modeled, but represents an oscilloscope function provided by the UI engine.

Figure 3B:
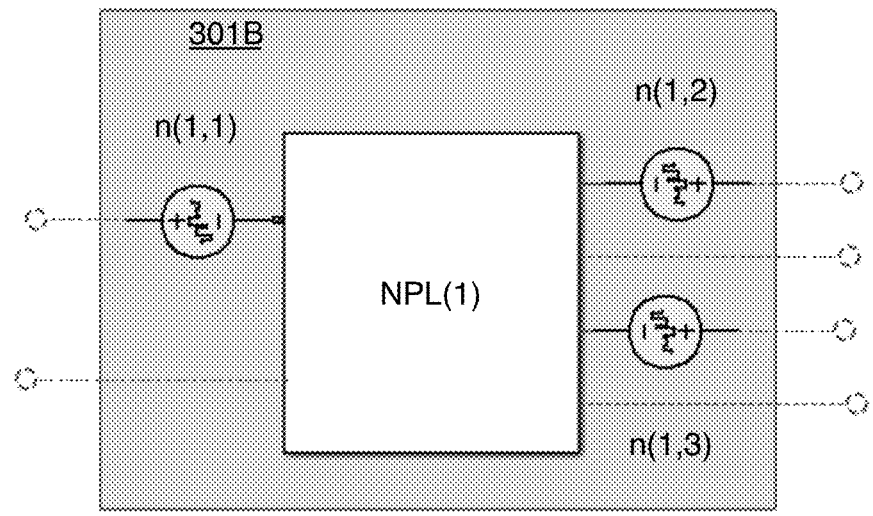
FIGS. 3B-3C are schematic diagrams of example linear subsystem NID representations.
Figure 3C:
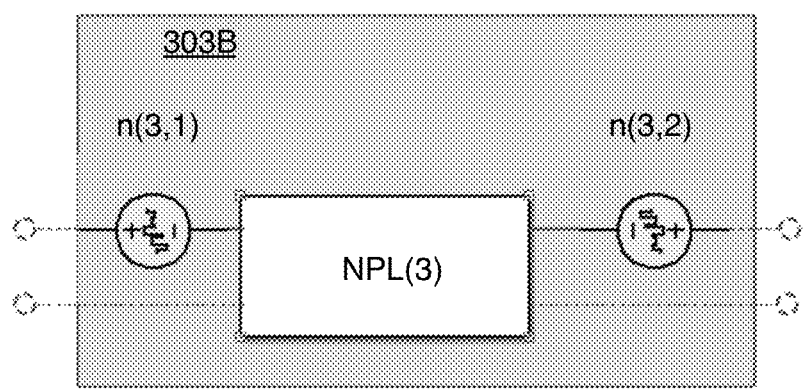

FIGS. 3B and 3C show examples of noise identified (NID) representations of each of the linear subsystems generated by the LSNM 110. In the NID representation, the circuit corresponding to the original subsystem (labeled "X") is replaced with an equivalent NPL subsystem (labeled "NPL(X)") that has the same number of input ports and the same number of output ports as the original circuit. Noise sources at each of the input and output ports for an original subsystem X are represented by a vector of correlated noise wave sources n(X,Y), where Y identifies each port, and n represents a Thevenin equivalent voltage source whose values, for subsystem X at port Y, are determined as described above.

The input and output ports of the NPL subsystems in these examples correspond to the input and output ports of an SPR associated with that NPL subsystem. These input and output ports are associated with related physics variables (and thus may be called "physics ports"). For example, each port may be associated with a pair of physics variables, such as conjugated variables. The pair of physics variables may comprise an effort and a flow variable or an across and a through variable. The pair of variables may determine a flow of energy (e.g., as described in more detail below). A physics port may have higher dimensions such that it may have a number of pairs of physics variable associated with it. For the analysis, the port of higher dimensionality may be decomposed into separate ports that each have one pair of physics variables associated them. In addition to a pair of physics variables, a physics port may have variables associated with it that do not determine the flow energy or that are neither effort nor flow variables or that are neither across nor through variables. The additional variables may be, for example, geometric, such as a location in space. The additional variables may be time derivatives of effort or flow variables or of across or through variables. For example, a physics port may comprise a pair of physics variables velocity and force that determine the flow of energy (or mechanical power) as well as variables such as acceleration (the time derivative of velocity) and variables such as position (a geometric variable).

In general, a model element, may be associated with a "signal port" that may be associated with a single variable or multiple variables. The variables may be characterized as input variables or as output variables. A signal port of higher dimension may have multiple variables associated with it that are all characterized as either input variables or output variables. A signal port may characterize access to a variable associated with the port. The access characterization of a variable may be read, write, or read and write. A signal port of higher dimension may have multiple variables associated with it that are all characterized as either read variables or write variables. The physical ports of the model elements in a simulation may provide a single physics variable in addition to the pair of related physics variables. For example, acceleration may be provided via a physics port even though acceleration may not technically be needed for simulation of dynamic behavior if velocity is provided already (e.g., since acceleration is a derivative of the velocity). However, for simulation stability or accuracy purposes, it may still be beneficial to have access to acceleration. Thus, different variables may be provided by ports along with the variables that are used for the noise characterization.

In the examples of FIGS. 3B to 3E illustrating the physics ports of an NPL, the input ports are shown on the left side of the box representing the now noiseless circuitry (i.e., without internal noise), and the output ports are shown on the right side of the box. In FIG. 3B, the NID representation 301B for the circuit of partition 301A includes an NPL subsystem NPL(1) with noise wave sources for one input port n(1,1) and for two output ports n(1,2) and n(1,3), where each port is made up of a pair of terminals including a signal terminal and a ground terminal. In alternative representations, an equivalent circuit could be represented showing different signal terminals being provided relative to the same ground terminal rather than providing each port with its own separate ground terminal. In FIG. 3C, the NID representation 303B for the circuit of partition 303A includes an NPL subsystem NPL(3) with noise wave sources for one input port n(3,1) and for one output port n(3,2). The effect of the NPL subsystem on signals entering and exiting over the input and output ports, respectively, is determined by the computed scattering matrix S, which as described above, does not include the effects of internal noise. In other words, the internal noise (e.g., thermal noise associated with resistors) is now replaced by the noise sources that are outside the NPL subsystem, which has no internal noise (e.g., ideal resistors without any thermal noise).

Figure 3D:
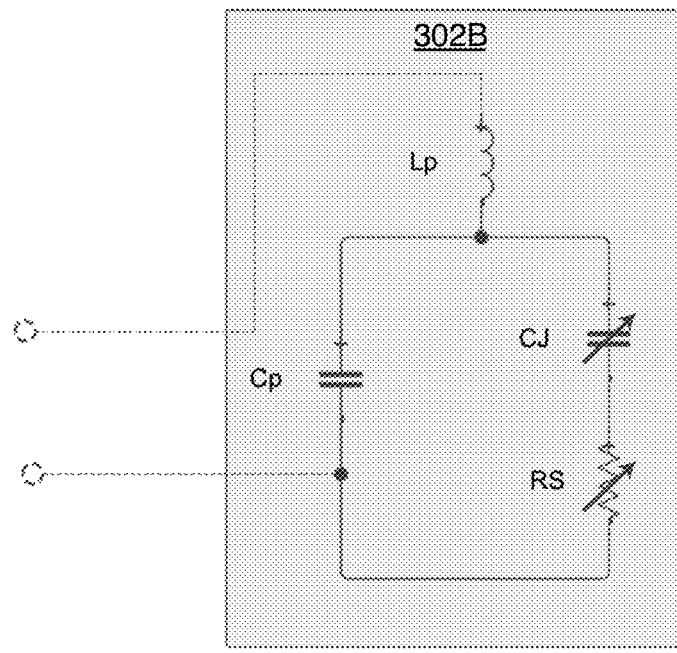
FIG. 3D is a schematic diagram of an example circuit model for a varactor diode.

FIG. 3D shows an example circuit model 302B for the varactor diode in the partition 302A. To simulate a model element such as the varactor diode, the stored data representing that model element may include equations, code, or other forms of data to provide the appropriate response for any signal applied at the input port (e.g., the appropriate load at the output port of a subsystem connected to that input port). For this example, the circuit model 302B is a simplified representation of that stored data for illustration purposes. The circuit model 302B includes both a voltage controlled capacitor (CJ) and a voltage controlled resistor (RS), which are each nonlinear element that at each time step of the simulation will be linearized around the operation point determined by the NSNM 128. The circuit model 302B also includes a capacitor (Cp) and an inductor (Lp), which are linear elements. While the partitioning algorithm generally attempts to group linear elements with the linear subsystems, since the stored data for the varactor diode may not expose the existence of these linear elements to the partitioning algorithm, this example shows how such linear elements may still be assigned to a nonlinear subsystem by the partitioner 106. This example also shows how certain model elements (e.g., the variable capacitor) may create short memory effects that the simulation is not always able to separate from the nonlinear effects. Though when there are such memory effects, the techniques described herein are still able to account for the memory effects when estimating noise.

Figure 3E:
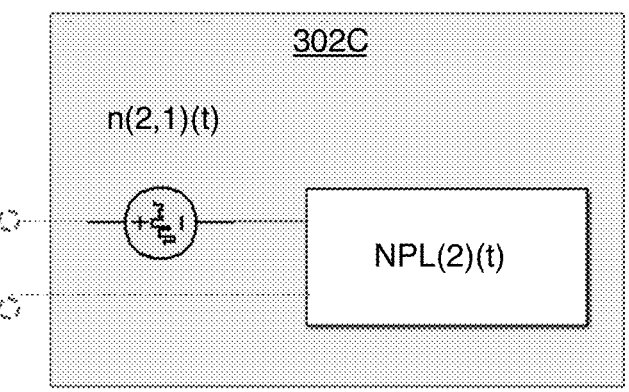
FIG. 3E is a schematic diagram of an example nonlinear subsystem NID representation.

FIG. 3E shows an example of the NID representation 302C of the nonlinear subsystem generated by the NSNM 128 for the linearized model of the varactor diode of partition 302A, which includes an NPL subsystem labeled NPL(2)(t) with a noise wave source for one input port labeled n(2,1)(t). Both labels indicate explicit time dependence since the characteristic values defining the scattering matrix associated with NPL(2)(t) and the noise wave source n(2,1)(t) may be recomputed at each time step of the simulation by the NSNM 128. For time steps where the operating point does not change substantially between consecutive time steps, the previous linearization results may be reused.

Figure 3F:
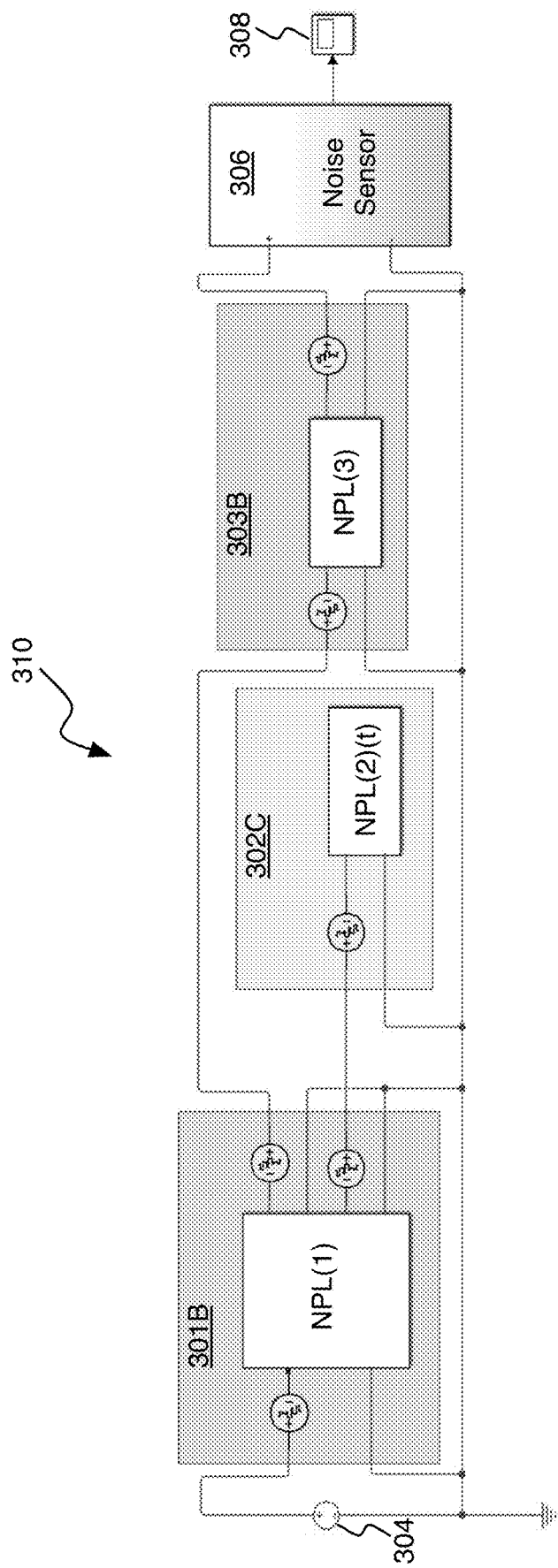
FIG. 3F is a schematic diagram of an example electrical circuit system NID representation.

FIG. 3F shows an example electrical circuit system NID representation after the solver 126 combines the different subsystems to obtain the overall representation of the system being simulated. The characteristic values defining the linear subsystems are computed once by the LSNM 110, but the characteristic values defining the nonlinear subsystem may be computed at each time step by the NSNM 128. So, the augmented EGM is updated each time step accordingly. While the characteristic values defining the linear subsystem, such as the scattering matrix for the NPL subsystem, and the structure of the noise wave sources do not necessarily need to be recomputed every time step, there may still be some computations to update the linear subsystem values associated with some variables that may change over time. For example, since the noise wave sources are temperature dependent, the noise values may be updated to reflect a change in temperature that models the heating of circuit elements (e.g., resistors) as the circuit operates. The solver 126 is able to determine the appropriate representation to model the combination of the linear and nonlinear subsystems based on successively connecting neighboring linear and nonlinear subsystems (e.g., using Thevenin or Norton equivalent representations as the subsystems are connected to each other). For example, after a first connection, the solver 126 can compute an effect of each accumulated connection of linear and nonlinear portions as a load for the next incrementally connected linear or nonlinear subsystem. In this manner, the effect of all noise sources on a given output port can be computed, as the effects of the noise sources are propagated through the linearized system.

Figure 4:
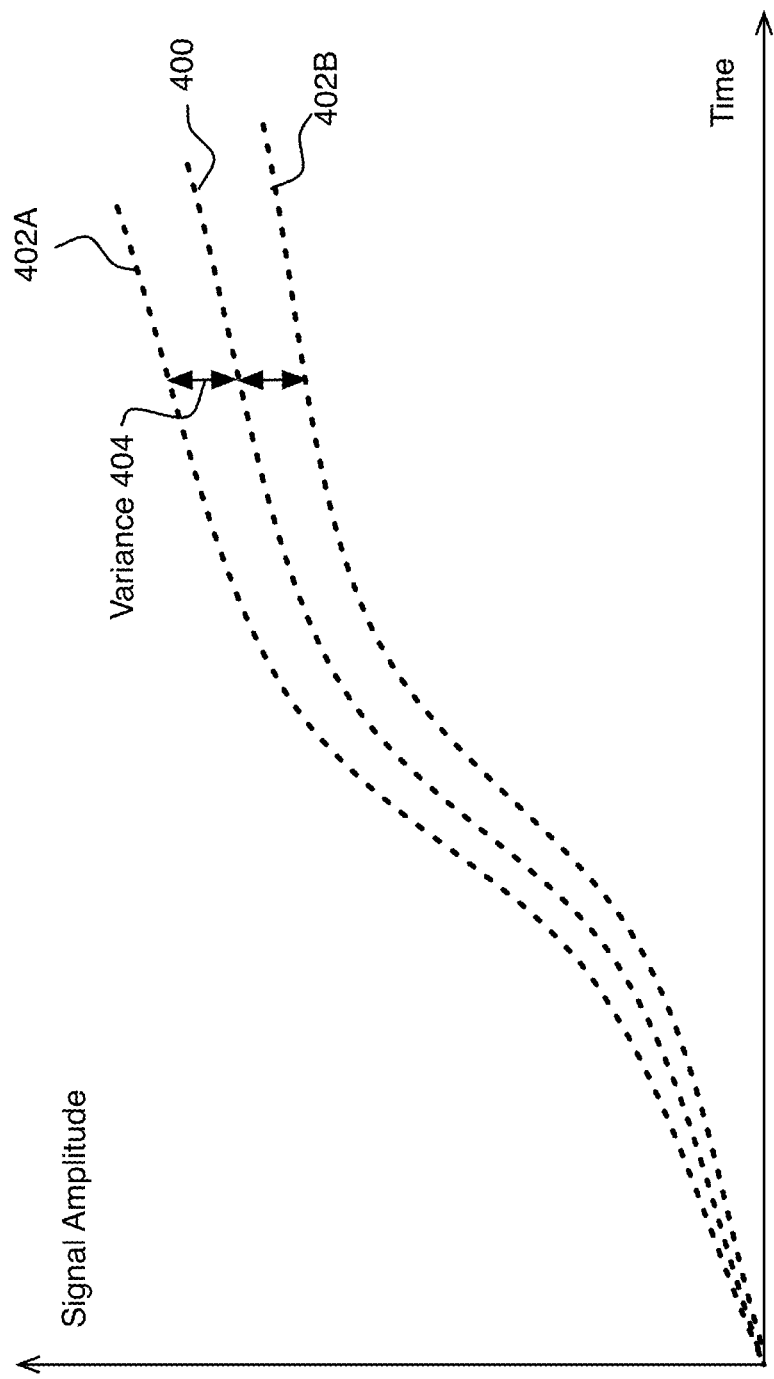
FIG. 4 is a plot of an example signal with noise characteristics.

FIG. 4 shows an example of a signal that could be rendered on a user interface screen, with display of noise characteristics of that signal. In this example, the noise characteristics are displayed by rendering a trace 400 of the large signal values representing the dynamic behavior of the simulation along with traces 402A, 402B that provide an envelope around the signal to represent the noise characteristics (small signal) associated with that dynamic behavior. The trace 400 of the signal represents a statistical mean, providing a baseline for the noise characteristics of the signal. The trace 402A is an upper envelope boundary that indicates a deviation from the mean in the positive direction, and the trace 402B is a lower envelope boundary that indicates a deviation from the mean in the negative direction. The distance between the mean trace 400 and the upper trace 402A, and the distance between the mean trace 400 and the lower trace 402B may both be set to a statistical variance 404, for example, computed based on the determined noise wave sources. Thus, the instantaneous output signal at a port of the system (or a port of a subsystem), can be viewed as a vector of statistical moments, with the first order moment being the mean, which is used to provide the baseline signal, and the second order moment being the variance, which is used to provide the envelope. Alternatively, the envelope can be based on other characteristic values such as the standard deviation (the square root of the variance), and/or higher order statistical noise terms.

In some embodiments, instead of an envelope, the noise characteristics can be provided interactively based on user input, without necessarily rendering an envelope or other visual indicators characterizing noise characteristics of the signal when the signal is rendered. In some embodiments, a simulated noise signal can be provided, where the noise is synthesized based on the noise characteristics determined from the combined effects of the noise wave sources. Those simulated noise signals at different ports can be provided as separate synthesized signals, or can be added to the mean signal, providing a total signal with noise. In the case of synthesized noise signals, the time interval used by a noise synthesizer for generating the synthesized noise signal may be much smaller than the time step used by the solver 126 for generating the mean signal since the variations due to noise may be over a much higher frequency (especially for "white noise" that has a large spectrum). The solver 126 does not need to execute with such a small time step since the solver 126 is only computing a statistical characteristic of the noise characteristics, and not an actual instantaneous noise signal. One of the advantages of some embodiments that automatically compute only internal noise (i.e., without needing to incorporate effects of external noise sources) over techniques that simulate the total signal with noise as one signal is that the solver 126 can execute much faster by computing fewer time steps per simulated interval of time.

The simulation can also be configured to use the variance or other noise characteristic to perform additional computation. For example, a portion of a system can be modeled for correcting for noise and/or reducing noise. There may be a user-specified bound on the noise, and model elements may be configured to respond if noise exceeds the user-specified bound. If there is a modeled temperature for each element, the simulation can include model elements that are configured to detect components where noise is large and reduce temperature selectively for those elements to bound the total noise within the user-specified bound. Techniques can be used to determine what temperature should be simulated. For example, based on the power that a diode is dissipating, the temperature of the diode (and its surroundings) can be estimated over the course of the simulation.

3 Exemplary Physical Systems for which Simulation and Noise Calculations can be Implemented The examples given above are described in terms of simulation of an electrical physical system in an electrical power physics domain, where resistive effects in modeled resistors are the source of thermal noise. But, the automatic noise estimation techniques described herein can be applied to other physics domains as well. For example, resistors may represent resistive or dissipative effects across physics domains other than electrical power. Also, capacitors and inductors may represent more general energy storage effects across physics domains other than electrical power. Voltage may represent intensity in the electrical domain. In other domains, intensity may be represented by temperature, pressure, velocity, and concentration. Current may represent a time derivative of extensity in the electrical domain, with charge being represented by extensity. In other domains, extensity may be represented by entropy, volume, momentum, and quantity of moles. The time derivative of extensity may be represented by entropy flow, volume flow, force, and flow of moles. Intensity may be referred to as effort and the time derivative of extensity may be referred to as flow.

So, the following are examples of equivalents to the pair of effort and flow variables of voltage and current, respectively, in the electrical domain, which can be used in the various equations, along with appropriate equivalents of the circuit element properties including resistance, capacitance, and inductance. In the mechanical domain, effort and flow variables of force and velocity, respectively, can be used. In the hydraulic (or incompressible fluid flow) domain, effort and flow variables of pressure and volumetric flow, respectively, can be used. In the pneumatic (or compressible fluid flow) domain, effort and flow variables of pressure and mass flow, respectively, can be used. In the thermal domain, effort and flow variables of temperature and entropy flow, respectively, can be used. In the chemical domain, effort and flow variables of chemical potential and molar flow, respectively, can be used.

Physics domains may be coupled, for example as each other's dual. For example, in the electrical domain, the effort or intensity may be voltage, the extensity may be charge, and the flow or time derivative of extensity may be current. In the magnetic domain, the intensity may be current, the extensity may be flux, and the time derivative of extensity may be voltage. The cross relationship between effort and flow corresponds to duality of the electrical and magnetic domains.

Resistive effects may produce resistive behavior of effort and flow. In case of linear behavior the product of a resistive parameter, R, with a flow equals an effort. Storage effects may produce time derivative behavior of extensity. A stored extensity changes its value as the time integral of an effort (e.g., in the magnetic domain stored flux changes based on voltage) or a flow (e.g., in the electrical domain stored charge changes based on current). In case of a linear behavior, the quotient of a stored extensity and a storage capacity parameter equals a flow (e.g., in the magnetic domain the quotient of stored flux and an inductance parameter, L) or an effort (e.g., in the electrical domain the quotient of stored charge and a capacitance parameter, C).

A network of electrical components may represent an ideal connection structure between the resistive and storage effects. In an ideal structure, connections carry power or transfer energy (the product of effort and flow) in a physics domain without loss (e.g., dissipation). Two types of connections exist based on generalized Kirchhoff's circuit laws. A connection type may be called a parallel connection if it is based on the generalized Kirchhoff's voltage law and balances efforts across the connection such that the sum of connected efforts equals zero while the connected flows are equal. A connection type may be called a series connection if it is based on the generalized Kirchhoff's current law and balances flows across the connection such that the sum of connected flows equals zero while the connected efforts are equal.

Subsystems with a network of linear electrical elements may correspond to a connection structure that consists of one or more parallel or series connections and resistive or storage effects. For example, a resistor and capacitor connected in series in the electrical domain may be generally represented by a series connection with a connected resistive effect and a connected storage effect such that its stored extensity is the time integral of the corresponding flow. The general structure represents behavior in different physics domains such as in the thermal, hydraulic, pneumatic, mechanical (linear and rotational), and chemical domains.

The resistive and storage effects represent passive behavior and may be referred to as passive elements. The functions that relate any of effort, flow, extensity, resistive parameters, storage parameters, series connections, and parallel connections may be linear or nonlinear. Linear electric circuits are a representation of general structures of linear resistive effects and linear storage effects connected via linear series and linear parallel connections.

In some embodiments, a simulation may rely on a unifying mathematical structure called the Hamiltonian of a physical system, which determines how physical systems (of any kind and also any interacting combination of such systems) evolve in terms of the total energy of any given state in a system. Many physical phenomena can be shown to have a corresponding Hamiltonian. And, while each branch of physics or mechanics has its own set of Hamiltonian variables and operators, most Hamiltonian systems share the same underlying structure. Through this unified view of different physics domains, these noise estimations techniques can be readily generalized to many physics domains that can be described as Port-controlled Hamiltonian Systems (e.g., as described by Arjan van der Schaft in "Port-controlled Hamiltonian systems: towards a theory for control and design of nonlinear physical systems," Journal of the Society of Instrument and Control Engineers of Japan (SICE), Vol. 39, nr. 2, pp. 91-98, 2000, incorporated herein by reference).

For the techniques described herein, the equations primarily rely on Effort and Flow Hamiltonian variables. Example steps have been described for noise estimation in the electrical power domain. The system of equations governing mathematical representation of other physics domains can be treated in a similar way to the electrical power domain while substituting the Hamiltonian variables of Voltage and Current with corresponding variables and associated domain specific equations.

4 Exemplary Solution Techniques

In case of implicit (e.g., computationally noncausal) equations, the partitioning considerations may account for the sorting of the equations and solving them, and determining which unknown variable to compute with which equation.

Figure 6:
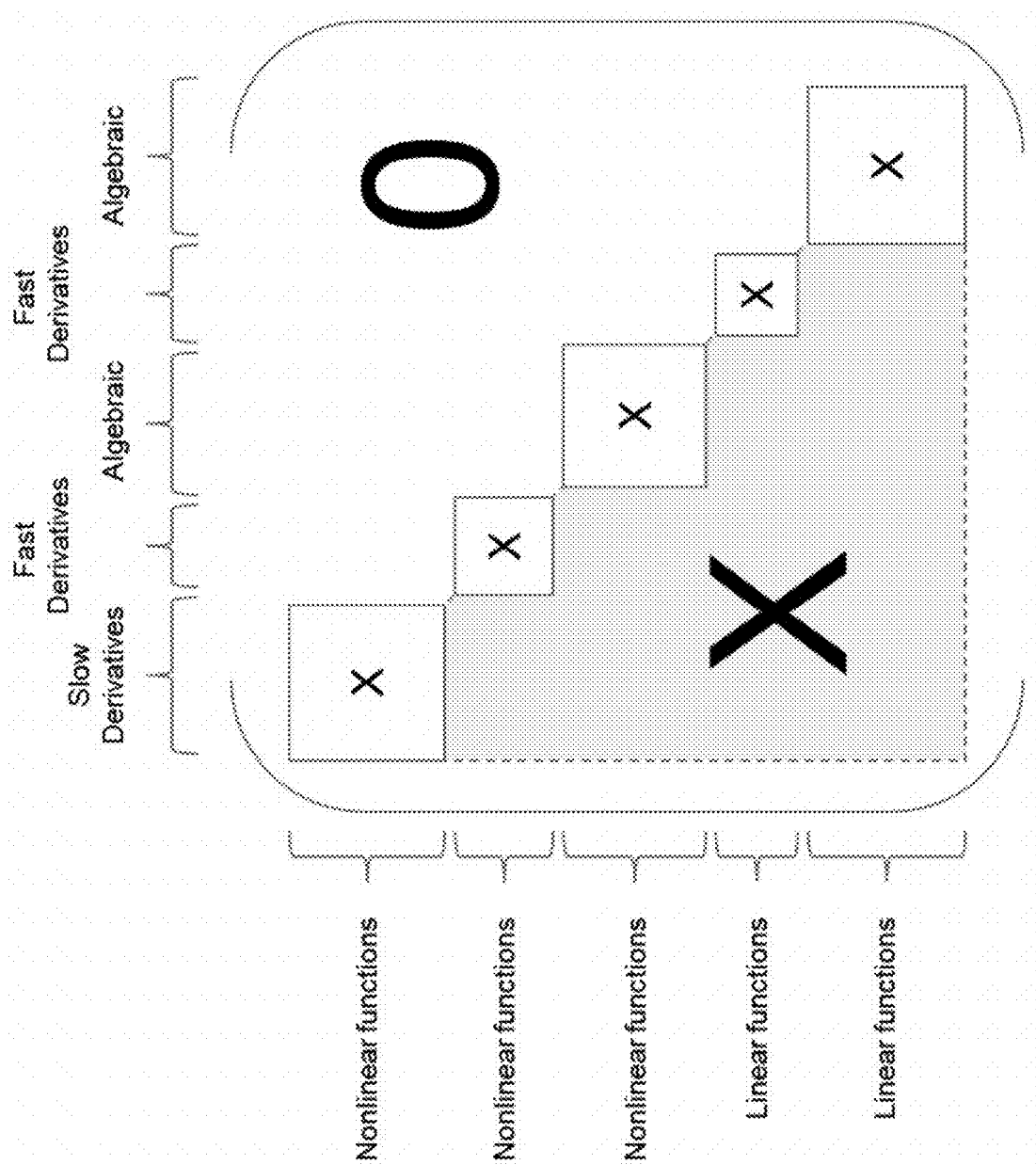
FIG. 6 is diagram of a matrix for example equation solution techniques.

For implicit equation based models the process of sorting equations may attempt to arrive a block lower triangular matrix with the rows being equations and the columns being unknown variables. The matrix is rectangular in case the number of unknowns equals the number of equations and a solution where each equation computes one variable may be found. This can be represented as shown in FIG. 6.

To add noise to the model the sorting may account for the computational complexity and create blocks of equations along the matrix diagonal for systems of equations that can be replaced by subsystems with noise sources. As an example, FIG. 6 shows a matrix where the equations are sorted such that equations with nonlinearity and non-shallow memory because of delay behavior in terms of the slow time derivative of variables are organized into one block (in the top-left corner). The slow derivative may be computed based on impulse response or time constant analysis, and the behavior is slow relative to the nonlinearity such that the noise correlation over a simulation time step of a linearized representation is not negligible. The next block down along the diagonal represents a system of nonlinear equations with variables that have time behavior that is fast and so have shallow memory behavior. The fast behavior is relative to the nonlinearities such that a linearized representation enables a noise correlation in time that is negligible over one simulation time step. The next block down represents a system of equations that are nonlinear and include only algebraic variables. The next block down represents a system of equations that are linear with variables that have time behavior that is fast as referred to by shallow memory behavior. Finally, the bottom-right block represents a system of linear equations over algebraic variables only. These various different systems of equations can be replaced by blocks as described with the noise sources based on the methodology described. By accounting for the noise effects in the sorting of equations, different solutions to the overall system of equations may be found than without. Also, it may be that the block types are sorted in different and interspersed order. For example, the equations with derivatives and nonlinear equations may not all be sorted in the top-left block of the matrix. Instead, a portion of these equations may be in the top-left corner, with others further down the diagonal and following a block with algebraic and linear equations. The sorting process may be setup to create maximal blocks of certain type (e.g., try to group as many of the nonlinear equations with fast derivatives into one block). Also, the sorting may create blocks that mix equations of different type but that are handled likewise for the noise determination (e.g., linear equations with fast derivatives and with algebraic variables may be sorted into one block in the sorted equations matrix). Also, nonlinearities and time constants may be determined to group equations and variables that have similar nonlinear and memory characteristics.

Other examples of the matrix can also have fewer or more blocks. For example, there could be another block for linear functions with slow derivatives. It may be preferred to first sort nonlinear equations with slow derivatives, so the impact of the block can be minimized. The linear functions with slow derivatives may not require smaller time steps because of temporal correlations, given that the s-parameters will not change. So, in that sense they can be treated similar to linear equations with fast derivatives, but they may still call for special treatment.

If there are long memory effects inside a subsystem that is nonlinear as well, then the approximation may become computationally more demanding because the algorithm may linearize more often. If the behavior in time is relatively long in duration, then the nonlinearity will be reflected (the s-parameters that were calculated to determine the noise will have changed) over one or more time steps. If there are relatively long memory effects, the algorithm can account for what happened in the past. If the system has memory and it has noise, then there is correlation in time as well as between model elements. The noise of a previous time step may be correlated with a current time step. The algorithm may be configured to aggregate more memory or as much memory as possible to the linear side, so that the nonlinear complications do not get exacerbated and lead to an approximation that may fail or provide poor results. The memory to be aggregated and included with the linear effects may be long memory effects (e.g., slow derivatives). For long memory effects, the algorithm may connect noise from the past (possibly long ago) to the present, but this correlation may then have changed. So, the correlation may only be valid for the duration that the linearity holds. And so, the memory effect should not exceed the nonlinear behavior change. So, the algorithm would group the (long) derivatives with the linearities, preferably.

5 Exemplary Modeling Environment

Figure 5:
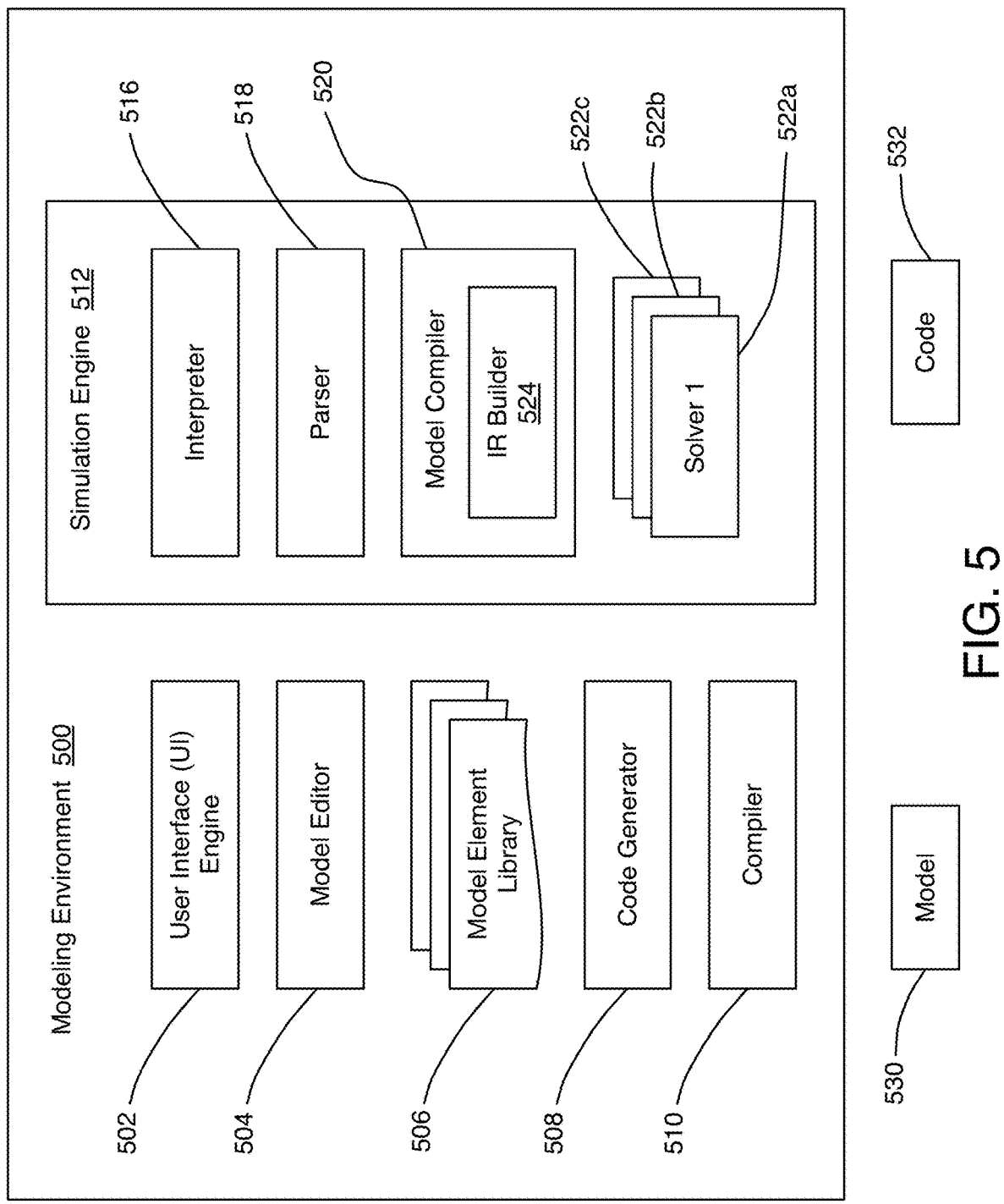
FIG. 5 is a block diagram of an example modeling environment.

FIG. 5 shows a schematic diagram of an example of a modeling environment 500 of the CMS in which the techniques described herein can be implemented. The modeling environment 500 may include a User Interface (UI) engine 502, a model editor 504, one or more model element libraries indicated at 506, a code generator 508, a compiler 510, and a simulation engine 512. The UI engine 502 may create and present one or more User Interfaces (UIs), such as Graphical User Interfaces (GUIs) and/or Command Line Interfaces (CLIs), on a display of a data processing device, such as a workstation, laptop, tablet, smartphone, etc. The GUIs and CLIs may provide a user interface to the modeling environment 500, such as a model editing window. The model editor 504 may perform selected operations on a model, such as open, create, edit, and save, in response to the user inputs or programmatically.

The simulation engine 512 may include an interpreter 516, a parser 518, a model compiler 520, and one or more solvers, such as solvers 522a-c. The model compiler 520 may include one or more Intermediate Representation (IR) builders, such as IR builder 524. In some implementations, one or more IR builders may be included or associated with the solvers 522. The simulation engine 512 may execute, e.g., compile and run or interpret, computer-generated, executable models using one or more of the solvers 522a-c. For example, the solvers 522 may generate a set of equations for a model and may solve the set of equations. Another approach would be for the model compiler 520 to create a data structure that represents, for example, model equations, and the solvers 522 then use this data structure to generate solutions. For example, the solvers 522 may generate a solution for an in-memory, intermediate representation (IR) of a model that represents a set of computational operations. The solvers 522 may generate the solution for the IR using numerical techniques. Exemplary solvers include one or more fixed-step continuous time solvers, which may utilize numerical integration techniques, and one or more variable-step solvers, which may for example be based on the Runge-Kutta and Dormand-Prince pair. With a fixed-step solver, the step size remains constant throughout simulation of the model. With a variable-step solver, the step size can vary from step to step, for example to meet error tolerances.

A non-exhaustive description of suitable solvers may be found in the *Simulink User's Guide* from The MathWorks, Inc. (March 2017 ed.). There may also be solvers to solve algebraic relations and solvers to find zero crossing locations of indicator functions. These solvers may have particular application in physics models.

The code generator 508 may access a model, such as model 530, and may generate code, such as code 532, for the model 530. In some embodiments, the generated code may be source code, which may be compiled by the compiler 508, and executed by one or more processors outside of the modeling environment 500. The generated code may thus be standalone code relative to the modeling environment 500. Examples of generated code include Ada, Basic, C, C++, C#, CUDA, SystemC, Ada, FORTRAN, assembly code, and Hardware Description Language (HDL) code, such as VHDL, Verilog, or SystemC, among others, which may be used to synthesize a programmable logic device.

The compiler 510 may prepare data structures and evaluate parameters, or parameter expressions, to create and/or initialize one or more data structures used in a compile stage. For each model element, a method may force the model element to evaluate all of its parameters. During the configuration and inferencing, for example by propagation, of model element and port/signal characteristics, the compiled attributes (such as data dimensions, data types, complexity, sample modes, and sample time) of each model element (and/or ports) may be setup on the basis of the corresponding behaviors and the attributes of model elements (and/or ports) that are related to the given model element, e.g., connected through lines that may be directed or undirected relations and shown as arrows. Attributes may also be setup based on the context of a model element or a component in a model. For example, a subsystem, which may be a group of model elements hierarchically represented as a single model element, that has a given sample time may have this sample time be set based on the sample time of model elements included in the subsystem (e.g., a unique sample time of all elements in the group or a base sample time such as the greatest common denominator of all sample times of the elements).

The attribute setup may be performed through a process during which model element behaviors "ripple through" the model from one model element to the next following signal or other connectivity, as well as through the hierarchical structure of the model, and may for example follow connectivity in a forward or backward manner. This process is referred to as "propagation." In the case of a model element that has explicitly specified or characterized its model element behaviors or the behaviors of its ports, propagation may help ensure that the attributes of the model element are compatible with the attributes of the model elements connected to it or contained by it. If not, an error may be issued. At least some model elements may be implemented to be compatible with a wide range of attributes. Such model elements may adapt their behavior in accordance with the attributes of the model elements connected to them. The exact implementation of the model element may be chosen on the basis of the model in which the model element is located. Included within this step are other aspects such as validating that all rate-transitions (e.g., transitions of sample times that have different rates between two connected model elements) yield deterministic results, and that the appropriate rate transition blocks are being used.

The compilation step also may determine model element connectivity. For example, a model may include one or more virtual blocks that may play no semantic role in the execution of the model. In this step, the virtual blocks may be optimized away, e.g., removed, and the remaining non-virtual model elements may be reconnected to each other appropriately. This compiled version of the model with actual model element connections may be used from this point forward in the execution process.

Exemplary modeling environments include the MATLAB® technical computing environment (TCE) and language/programming environment, and the Simulink® model-based simulation and design environment both from The MathWorks, Inc. of Natick, Mass., as well as the Simscape™ physical modeling system, the SimEvent® discrete-event modeling tool, and the Stateflow® state chart modeling tool also from The MathWorks, Inc., the MapleSim physical modeling and simulation tool from Waterloo Maple Inc. of Waterloo, Ontario, Canada, the GTSUITE modeling and simulation environment from Gamma Technologies, LLC of Chicago, Ill., the Ricardo WAVE and WAVE RT modeling and simulation tools of Ricardo Software of Chicago, Ill., a subsidiary of Ricardo plc, the AVL Boost modeling and simulation tool of AVL Gmbh of Graz, Austria, the LabVIEW virtual instrument programming system and the NI MatrixX model-based design product both from National Instruments Corp. of Austin, Tex., the Visual Engineering Environment (VEE) product from Keysight Technologies Inc. of Santa Rosa, Calif., the System Studio model-based signal processing algorithm design and analysis tool and the SPW signal processing algorithm tool from Synopsys, Inc. of Mountain View, Calif., a Unified Modeling Language (UML) system, a Systems Modeling Language (SysML) system, the System Generator system from Xilinx, Inc. of San Jose, Calif., the Rational Rhapsody Design Manager software from IBM Corp. of Somers, N.Y., the Dymola modeling and simulation environment of Dassault Systèmes, and the ANSYS embedded software platform including the SCADE suite. Models created in the high-level modeling environment may contain less implementation detail, and thus operate at a higher level than certain programming languages, such as the C, C++, C#, and SystemC programming languages.

A given model may simulate, e.g., approximate the operation of, a system. Exemplary systems include physical systems, such as plants and controllers. A model may be executed in order to simulate the system being modeled, and the execution of a model may also be referred to as simulating the model. Models constructed within the modeling environment 500 may include textual models, graphical models, such as block diagrams, state-based models, discrete-event models, physical or physics models, noncausal (or acausal) models (e.g., implicit equation based models), equation-based models, object-oriented models, and combinations thereof. A graphical model may include icons or blocks that represent computations, functions, or operations, and interconnecting lines or arrows among the blocks may represent data, signals, or relationships among those computations, functions, or operations. The icons or blocks, moreover, may be selected by the user from one or more of the libraries or palettes 506 that contain icons or blocks for the blocks supported by the modeling environment 500. A model editor GUI may include a Run button that may be selected by the user. The modeling environment 500 may also be configured to receive a run command entered by the user, e.g., in the GUI or in a Command Line Interface (CLI). In response to the user selecting the Run button or entering the run command, the simulation engine 512 may execute the model, and may present the results of the model's execution to a user. Exemplary graphical models include Simulink models, Simscape physical models, SimEvent models, Stateflow charts, LabVIEW block diagrams, MatrixX models, Scade models, Dymola models, VEE diagrams, and Rational Rhapsody models, among others. Other forms of a source program include Modelica models from the Modelica Association, Uniform Modeling Language (UML) models, and Systems Modeling Language (SysML) models, among others.

The MATLAB® TCE is a math-oriented, textual programming environment for control system design, digital signal processing (DSP) design, system identification, optimization, and machine learning, among other uses. The Simulink® model-based simulation environment and design environment is a tool for modeling, simulating, optimizing, verifying and validating, and testing dynamic and other systems, among other uses. The MATLAB® and Simulink® environments provide a number of high-level features that facilitate algorithm development and exploration, and support model-based design. Exemplary high-level features include late binding or dynamic typing, array-based operations, data type inferencing, sample time inferencing, and execution order inferencing, among others. Inferencing may involve, for example, deduction of certain attributes associated with the model from other attributes already associated with the model. There may be a predetermined order in in which blocks that represent functionality are to be processed for inferencing, which may be used during code generation, for example.

In some embodiments, the modeling environment 500 may implement a declarative language. A declarative language is a language that expresses the logic of a computation without describing its control flow. A declarative language may describe what a program must accomplish in terms of the problem domain, rather than describe how to accomplish it as a sequence of the programming language statements. In some cases, a declarative language may implement single assignment in which variables are assigned once and only once. Examples of support for declarative languages include the Simulink® model-based design environment, which is a time-based language, the Modelica modeling language, and the LabVIEW graphical programming system, Hardware Description Language (HDL), the Prolog language, and the Haskell language, among others. Behaviors of at least some of the model elements and connection elements of a model may include computational implementations that are implicitly defined by a declarative language. The modeling environment 500 may also support constraint modeling (or graphical constraint programming), for example, as supported by Simulink.

It should be understood that the modeling environment 500 is intended for illustrative purposes and that the present disclosure may be used with other modeling environments. For example, in some implementations, the code generator 508 and/or the compiler 510 may be separate from the modeling environment 500.

One or more of the user interface engine 502, the model editor 504, the code generator 508, the compiler 510, and the simulation engine 512 may be implemented through one or more software modules or libraries containing program instructions that perform the methods described herein. The software modules may be stored in a memory, such as a main memory, a persistent memory and/or a computer readable media, of a workstation, server, or other data processing machine or device, and executed by one or more processors. Other computer readable media may also be used to store and execute these program instructions, such as non-transitory computer readable media, including optical, magnetic, or magneto-optical media. In some embodiments, one or more of the user interface engine 502, the model editor 504, the code generator 508, the compiler 510, and the simulation engine 512 may comprise hardware registers and combinational logic configured and arranged to produce sequential logic circuits. In some embodiments, various combinations of software and hardware, including firmware, may be utilized to implement the described methods.

Suitable code generators for use with the present disclosure include, but are not limited to, the Simulink Coder, the Embedded Coder, and the Simulink HDL Coder products from The MathWorks, Inc. of Natick, Ma., the TargetLink product from dSpace GmbH of Paderborn Germany, and QGen from Adacore. Suitable target language compilers include the xPC Target™ tool from The MathWorks, Inc., and a C language compiler. However, other code generation systems and other compilers may be used.

The headings above are intended to aid with readability of the application, and are not for use in construing aspects of, or determining the breath of, embodiments of the invention described in the specification or claims. It is to be understood that the foregoing description is intended to illustrate and not to limit the scope of the invention, which is defined by the scope of the appended claims. Other embodiments are within the scope of the following claims.

What is claimed is:

1. A method comprising:

analyzing, by one or more processors, model elements of an executable model to partition the model elements into one or more linear portions of the executable model and one or more nonlinear portions of the executable model, the executable model representing a physical system comprising a hydraulic system, an electrical system, a mechanical system, or a pneumatic system;

executing the executable model to simulate behavior of the physical system, the simulating including, for each of multiple time intervals of the simulation:

for a first nonlinear portion, computing a correlation matrix characterizing noise associated with one or more ports of the executable model, the computing comprising (1) determining a scattering matrix that corresponds to a portion of the physical system represented by the first nonlinear portion without accounting for any noise within the portion of the physical system, and (2) based on noise within the portion of the physical system, deriving the correlation matrix from the scattering matrix, identifying noise sources representing noise within the portion of the physical system based on the correlation matrix, and computing at least one characteristic of noise associated with each noise source; and outputting noise characteristics at selected ports of the executable model;

wherein the simulating further includes linearizing the first nonlinear portion at a first operating point during a first of the time intervals of the simulation, and computing the correlation matrix based on a linear representation of the first nonlinear portion, and repeating the linearizing of the first nonlinear portion at a second operating point, where the second operating point occurs during a second of the time intervals of the simulation, and the repeating occurs after a time duration between the second operating point and the first operating point exceeds a tolerance.

2. The method of claim 1, wherein outputting noise characteristics at selected ports of the executable model includes computing at least one noise characteristic for each of the selected ports of the executable model based at least in part on a representation of the physical system that includes representations of the linear portions of the executable model and linearized representations of the nonlinear portions of the executable model.

3. The method of claim 1, wherein outputting noise characteristics at selected ports of the executable model includes simulating at least one signal that has values computed based at least in part on the noise characteristics.

4. The method of claim 3, wherein operations of the model elements are performed on signals without noise and on signals with noise separately, before simulating the signal.

5. The method of claim 1, wherein, during the linearizing of the first nonlinear portion, if a number of iterations to reach the linear representation of the first nonlinear portion exceeds a threshold for converging, changing a length of the first time interval.

6. The method of claim 1, wherein outputting the noise characteristics at selected ports of the executable model includes rendering a plot that includes a characterization of the noise associated with at least one noise source.

7. The method of claim 1, further including, before executing the executable model, for one or more of the linear portions of the executable model, pre-computing at least one noise representation associated with a portion of the physical system represented by the one or more of the linear portions, where the pre-computed noise representation is used, during execution of the executable model, for determining noise characteristics associated with the one or more of the linear portions.

8. The method of claim 1, wherein the simulating further includes using the outputted noise characteristics to modify the executable model to reduce noise when simulating the behavior of the physical system.

9. The method of claim 1, wherein the partitioning includes sorting representations of equations corresponding to the model elements, where the sorting is based at least in part on one or more of: a presence of nonlinearity, a presence of memory effects, or a magnitude of a time derivative of a variable in the equations.

10. The method of claim 9, wherein the sorting is based at least in part on a comparison between: (1) a magnitude of a time derivative of a variable in a first equation corresponding to a first model element, and (2) a magnitude of a nonlinear effect due to a presence of nonlinearity in the first equation.

11. The method of claim 9, wherein the sorting includes determining a partial ordering of the equations.

12. The method of claim 11, wherein the partial ordering of the equations determines a partial ordering of rows in a matrix representing a system of equations.

13. The method of claim 1, wherein the portion of the physical system represented by the first nonlinear portion stores energy.

14. The method of claim 13, wherein computing the scattering matrix includes: computing time varying noise parameters over multiple time instances during a first time interval of the multiple time intervals, based on an autocorrelation characterizing a memory effect of the energy storage of the portion of the physical system represented by the first nonlinear portion.

15. The method of claim 1, wherein computed noise characteristics associated with at least one of the noise sources include noise values representing a time evolution of noise based on at least one statistical moment of second or higher order associated with signal values representing a statistical mean.

16. The method of claim 1, wherein the noise within the portion of the physical system represented by the first nonlinear portion comprises thermal noise or temperature-dependent noise.

17. The method of claim 1, wherein the noise within the portion of the physical system represented by the first nonlinear portion comprises internal noise generated within the portion of the physical system represented by the first nonlinear portion.

18. A computing system comprising:
one or more processors configured to:
analyze model elements of an executable model to partition the model elements into one or more linear portions of the executable model and one or more nonlinear portions of the executable model, the executable model representing a physical system comprising a hydraulic system, an electrical system, a mechanical system, or a pneumatic system;
execute the executable model to simulate behavior of the physical system, the simulating including, for each of multiple time intervals of the simulation:
for a first nonlinear portion, computing a correlation matrix characterizing noise associated with one or more ports of the executable model, the computing comprising (1) determining a scattering matrix that corresponds to a portion of the physical system represented by the first nonlinear portion without accounting for any noise within the portion of the physical system, and (2) based on noise within the portion of the physical system, deriving the correlation matrix from the scattering matrix,
identifying noise sources representing noise within the portion of the physical system based on the correlation matrix, and
computing at least one characteristic of noise associated with each noise source; and
output noise characteristics at selected ports of the executable model;
wherein the simulating further includes
linearizing the first nonlinear portion at a first operating point during a first of the time intervals of the simulation, and computing the correlation matrix based on a linear representation of the first nonlinear portion, and
repeating the linearizing of the first nonlinear portion at a second operating point, where the second operating point occurs during a second of the time intervals of the simulation, and the repeating occurs after a time duration between the second operating point and the first operating point exceeds a tolerance.

19. The computing system of claim 18, wherein outputting noise characteristics at selected ports of the executable model includes computing at least one noise characteristic for each of the selected ports of the executable model based at least in part on a representation of the physical system that includes representations of the linear portions of the executable model and linearized representations of the nonlinear portions of the executable model.

20. The computing system of claim 18, wherein outputting noise characteristics at selected ports of the executable model includes simulating at least one signal that has values computed based at least in part on the noise characteristics.

21. One or more non-transitory computer-readable media, having stored thereon instructions that, when executed by a computing system, cause the computing system to perform operations comprising:

analyzing model elements of an executable model to partition the model elements into one or more linear portions of the executable model and one or more nonlinear portions of the executable model, the executable model representing a physical system comprising a hydraulic system, an electrical system, a mechanical system, or a pneumatic system;

executing the executable model to simulate behavior of the physical system, the simulating including, for each of multiple time intervals of the simulation:

for a first nonlinear portion, computing a correlation matrix characterizing noise associated with one or more ports of the executable model, the computing comprising (1) determining a scattering matrix that corresponds to a portion of the physical system represented by the first nonlinear portion without accounting for any noise within the portion of the physical system, and (2) based on noise within the portion of the physical system, deriving the correlation matrix from the scattering matrix, identifying noise sources representing noise within the portion of the physical system based on the correlation matrix, and computing at least one characteristic of noise associated with each noise source; and outputting noise characteristics at selected ports of the executable model;

wherein the simulating further includes linearizing the first nonlinear portion at a first operating point during a first of the time intervals of the simulation, and computing the correlation matrix based on a linear representation of the first nonlinear portion, and repeating the linearizing of the first nonlinear portion at a second operating point, where the second operating point occurs during a second of the time intervals of the simulation, and the repeating occurs after a time duration between the second operating point and the first operating point exceeds a tolerance.

22. The one or more non-transitory computer-readable media of claim 21, wherein outputting noise characteristics at selected ports of the executable model includes computing at least one noise characteristic for each of the selected ports of the executable model based at least in part on a representation of the physical system that includes representations of the linear portions of the executable model and linearized representations of the nonlinear portions of the executable model.

23. The one or more non-transitory computer-readable media of claim 21, wherein outputting noise characteristics at selected ports of the executable model includes simulating at least one signal that has values computed based at least in part on the noise characteristics.

24. A method comprising:

analyzing, by one or more processors, model elements of an executable model to partition the model elements into one or more linear portions of the executable model and one or more nonlinear portions of the executable model, the executable model representing a physical system comprising a hydraulic system, an electrical system, a mechanical system, or a pneumatic system;

executing the executable model to simulate behavior of the physical system, the simulating including, for each of multiple time intervals of the simulation:

for a first nonlinear portion, computing a correlation matrix characterizing noise associated with one or more ports of the executable model, the computing comprising (1) determining a scattering matrix that corresponds to a portion of the physical system represented by the first nonlinear portion without accounting for any noise within the portion of the physical system, and (2) based on noise within the portion of the physical system, deriving the correlation matrix from the scattering matrix, identifying noise sources representing noise within the portion of the physical system based on the correlation matrix, and computing at least one characteristic of noise associated with each noise source; and outputting noise characteristics at selected ports of the executable model;

wherein the partitioning includes sorting representations of equations corresponding to the model elements, and the sorting is based at least in part on a comparison between: (1) a magnitude of a time derivative of a variable in a first equation corresponding to a first model element, and (2) a magnitude of a nonlinear effect due to a presence of nonlinearity in the first equation.

25. The method of claim 24, wherein outputting noise characteristics at selected ports of the executable model includes computing at least one noise characteristic for each of the selected ports of the executable model based at least in part on a representation of the physical system that includes representations of the linear portions of the executable model and linearized representations of the nonlinear portions of the executable model.

26. The method of claim 24, wherein outputting noise characteristics at selected ports of the executable model includes simulating at least one signal that has values computed based at least in part on the noise characteristics.

27. The method of claim 24, wherein the portion of the physical system represented by the first nonlinear portion stores energy; and computing the scattering matrix includes: computing time varying noise parameters over multiple time instances during a first time interval of the multiple time intervals, based on an autocorrelation characterizing a memory effect of the energy storage of the portion of the physical system represented by the first nonlinear portion.

28. The method of claim 24, wherein the sorting includes determining a partial ordering of the equations; and the partial ordering of the equations determines a partial ordering of rows in a matrix representing a system of equations.

29. The method of claim 24, wherein the noise within the portion of the physical system represented by the first nonlinear portion comprises thermal noise or temperature-dependent noise.

30. The method of claim 24, wherein the noise within the portion of the physical system represented by the first nonlinear portion comprises internal noise generated within the portion of the physical system represented by the first nonlinear portion.

31. One or more non-transitory computer-readable media, having stored thereon instructions that, when executed by a computing system, cause the computing system to perform operations comprising:
- analyzing model elements of an executable model to partition the model elements into one or more linear portions of the executable model and one or more nonlinear portions of the executable model, the executable model representing a physical system comprising a hydraulic system, an electrical system, a mechanical system, or a pneumatic system;
- executing the executable model to simulate behavior of the physical system, the simulating including, for each of multiple time intervals of the simulation:
  - for a first nonlinear portion, computing a correlation matrix characterizing noise associated with one or more ports of the executable model, the computing comprising (1) determining a scattering matrix that corresponds to a portion of the physical system represented by the first nonlinear portion without accounting for any noise within the portion of the physical system, and (2) based on noise within the portion of the physical system, deriving the correlation matrix from the scattering matrix,
  - identifying noise sources representing noise within the portion of the physical system based on the correlation matrix, and
  - computing at least one characteristic of noise associated with each noise source; and
- outputting noise characteristics at selected ports of the executable model;
- wherein the partitioning includes sorting representations of equations corresponding to the model elements, and the sorting is based at least in part on a comparison between: (1) a magnitude of a time derivative of a variable in a first equation corresponding to a first model element, and (2) a magnitude of a nonlinear effect due to a presence of nonlinearity in the first equation.

32. The one or more non-transitory computer-readable media of claim 31, wherein outputting noise characteristics at selected ports of the executable model includes computing at least one noise characteristic for each of the selected ports of the executable model based at least in part on a representation of the physical system that includes representations of the linear portions of the executable model and linearized representations of the nonlinear portions of the executable model.

33. The one or more non-transitory computer-readable media of claim 31, wherein outputting noise characteristics at selected ports of the executable model includes simulating at least one signal that has values computed based at least in part on the noise characteristics.

34. The one or more non-transitory computer-readable media of claim 31, wherein
- the sorting includes determining a partial ordering of the equations; and
- the partial ordering of the equations determines a partial ordering of rows in a matrix representing a system of equations.

35. The one or more non-transitory computer-readable media of claim 31, wherein the noise within the portion of the physical system represented by the first nonlinear portion comprises thermal noise or temperature-dependent noise.

36. The one or more non-transitory computer-readable media of claim 31, wherein the noise within the portion of the physical system represented by the first nonlinear portion comprises internal noise generated within the portion of the physical system represented by the first nonlinear portion.

* * * * *